(12) United States Patent
Tanaka et al.

(10) Patent No.: US 7,965,454 B2
(45) Date of Patent: Jun. 21, 2011

(54) IMAGING LENS AND SMALL-SIZE IMAGE PICKUP APPARATUS USING THE SAME

(75) Inventors: Hiroaki Tanaka, Sakai (JP); Masashi Isono, Toyokawa (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 12/546,459

(22) Filed: Aug. 24, 2009

(65) Prior Publication Data

US 2010/0053776 A1    Mar. 4, 2010

(30) Foreign Application Priority Data

Aug. 28, 2008 (JP) ................................. 2008-219698

(51) Int. Cl.
*G02B 9/00* (2006.01)
*G02B 27/64* (2006.01)
(52) U.S. Cl. .................... 359/754; 359/557; 359/739
(58) Field of Classification Search .......... 359/754–760, 359/763–769, 771–780, 784–795; 369/112.01–112.29
See application file for complete search history.

(56) References Cited

U.S. PATENT DOCUMENTS

| 6,795,253 B2 | 9/2004 | Shinohara | |
| 7,443,610 B1 * | 10/2008 | Lin et al. | 359/714 |
| 7,663,816 B2 * | 2/2010 | Sato | 359/794 |

FOREIGN PATENT DOCUMENTS

JP    2003-322792    11/2003

* cited by examiner

*Primary Examiner* — Darryl J Collins
(74) *Attorney, Agent, or Firm* — Cohen Pontani Lieberman & Pavane LLP

(57) ABSTRACT

There are provided an imaging lens, which is capable of promoting high definition and miniaturization of a small-size image pickup apparatus, and the small-size image pickup apparatus using the same. A aperture diaphragm S is arranged between a first lens L1 and a second lens L2 so that the first lens L1 is configured to be displaced into the orthogonal direction to the optical axis. Even when an error sensitivity of a lens is large, a stable high resolution can be secured by performing a lens alignment by displacing the first lens L1 into the orthogonal direction to the optical axis at the time of assembling, and thereby a high definition image can be obtained.

11 Claims, 18 Drawing Sheets

FIG. 3a
FIG. 3b
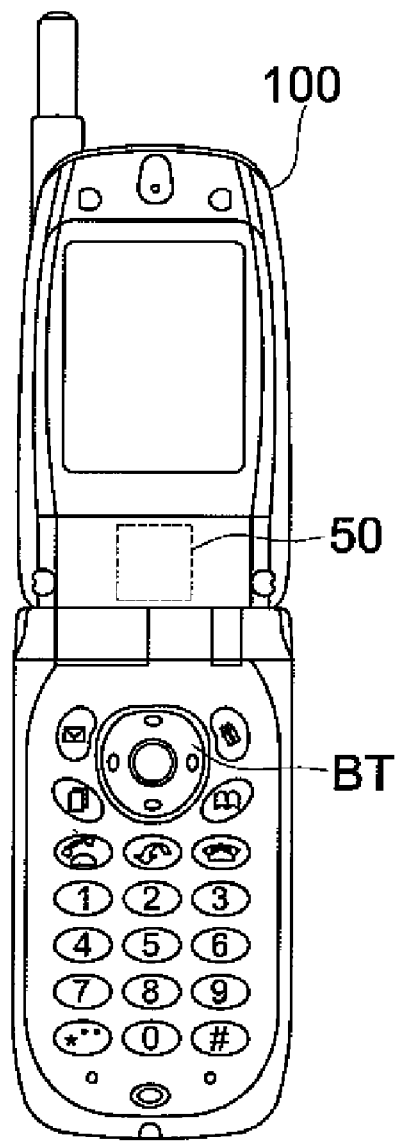
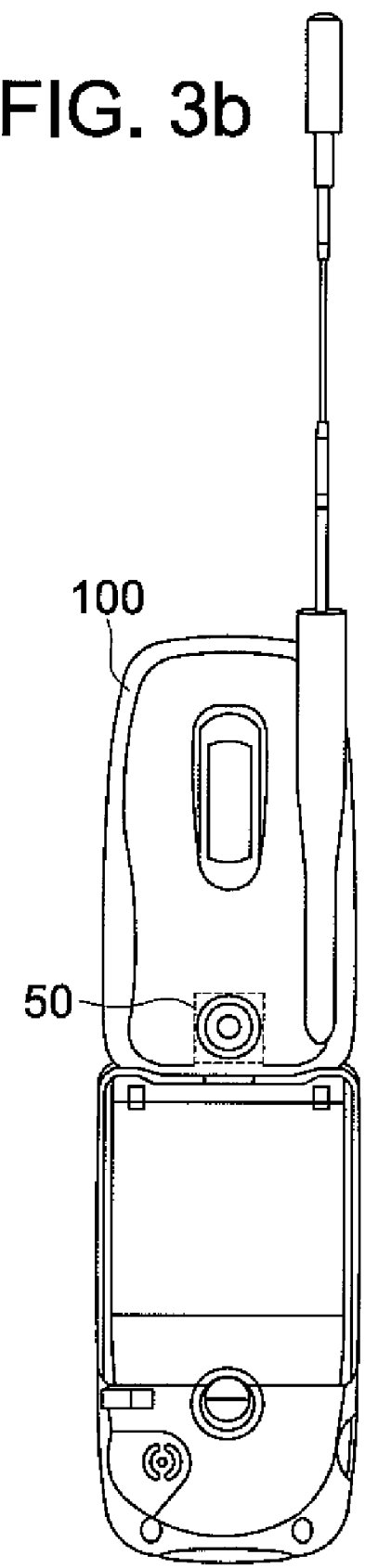

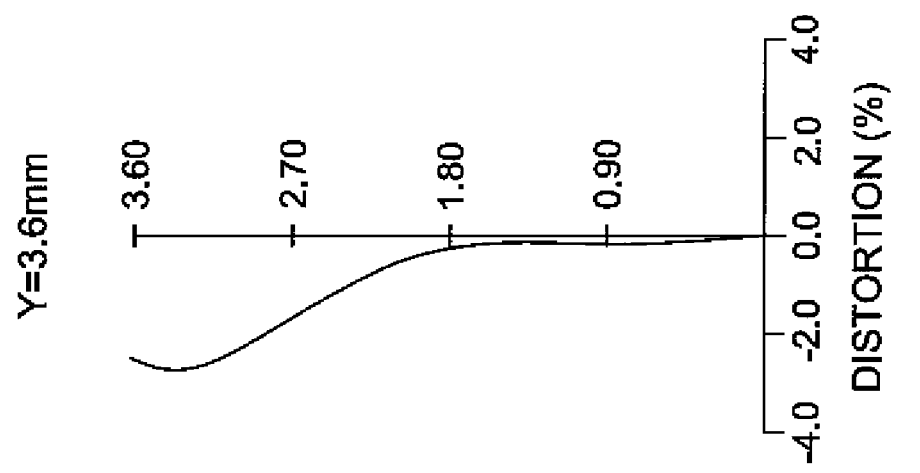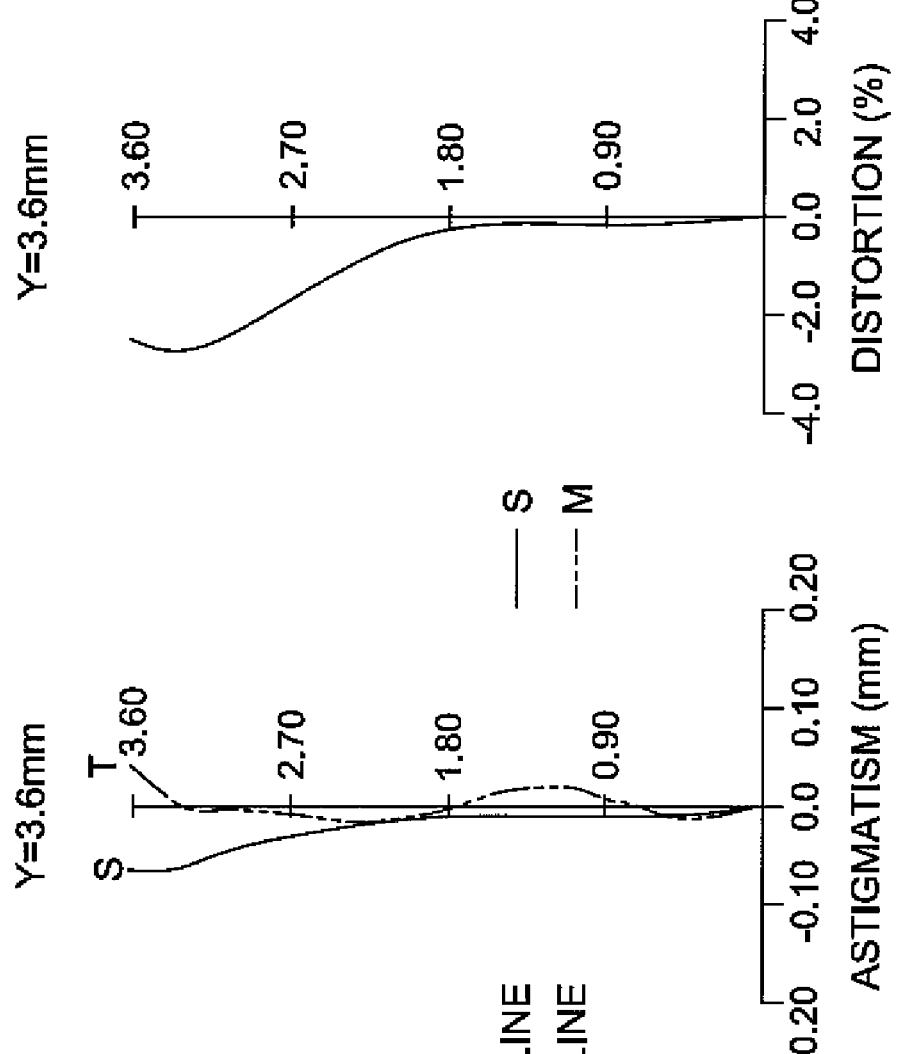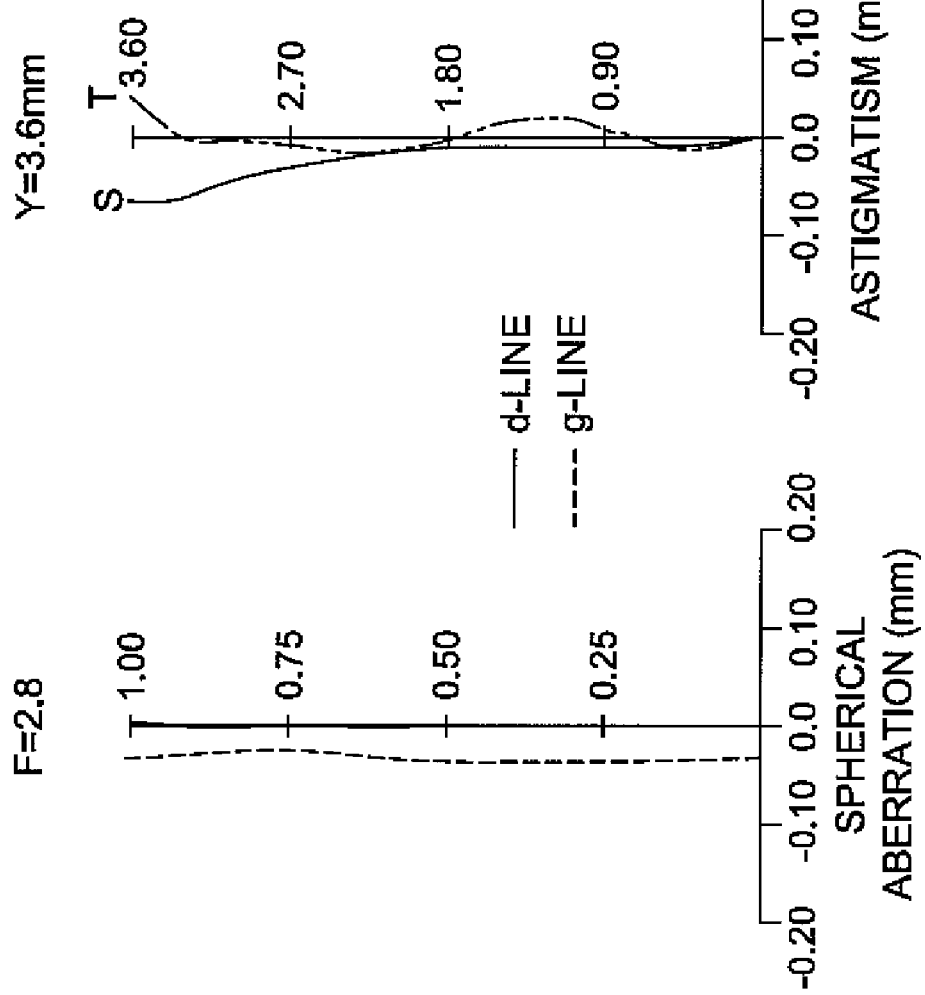

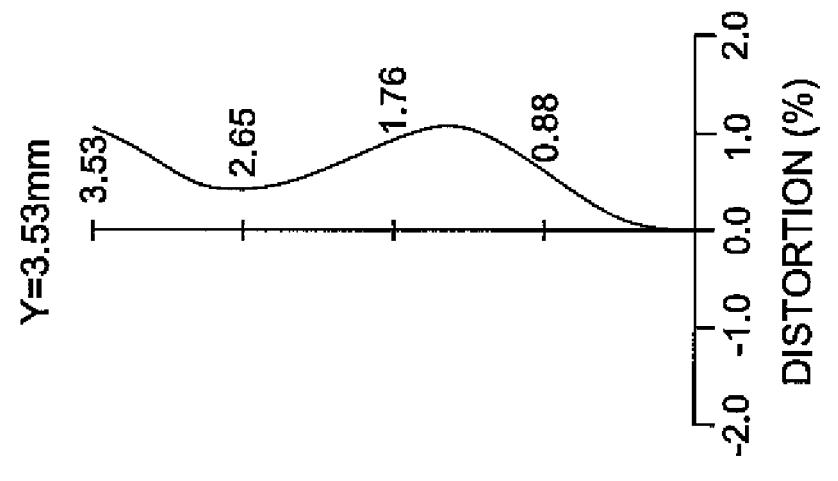
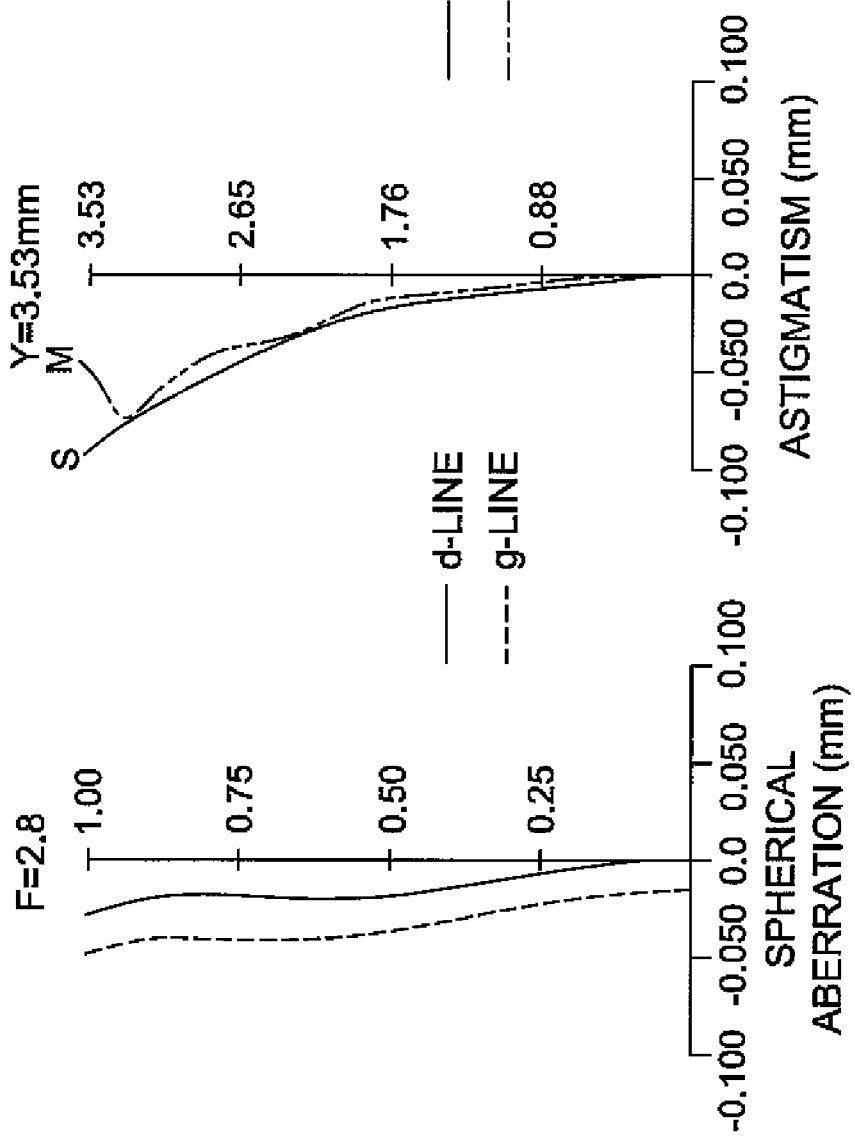

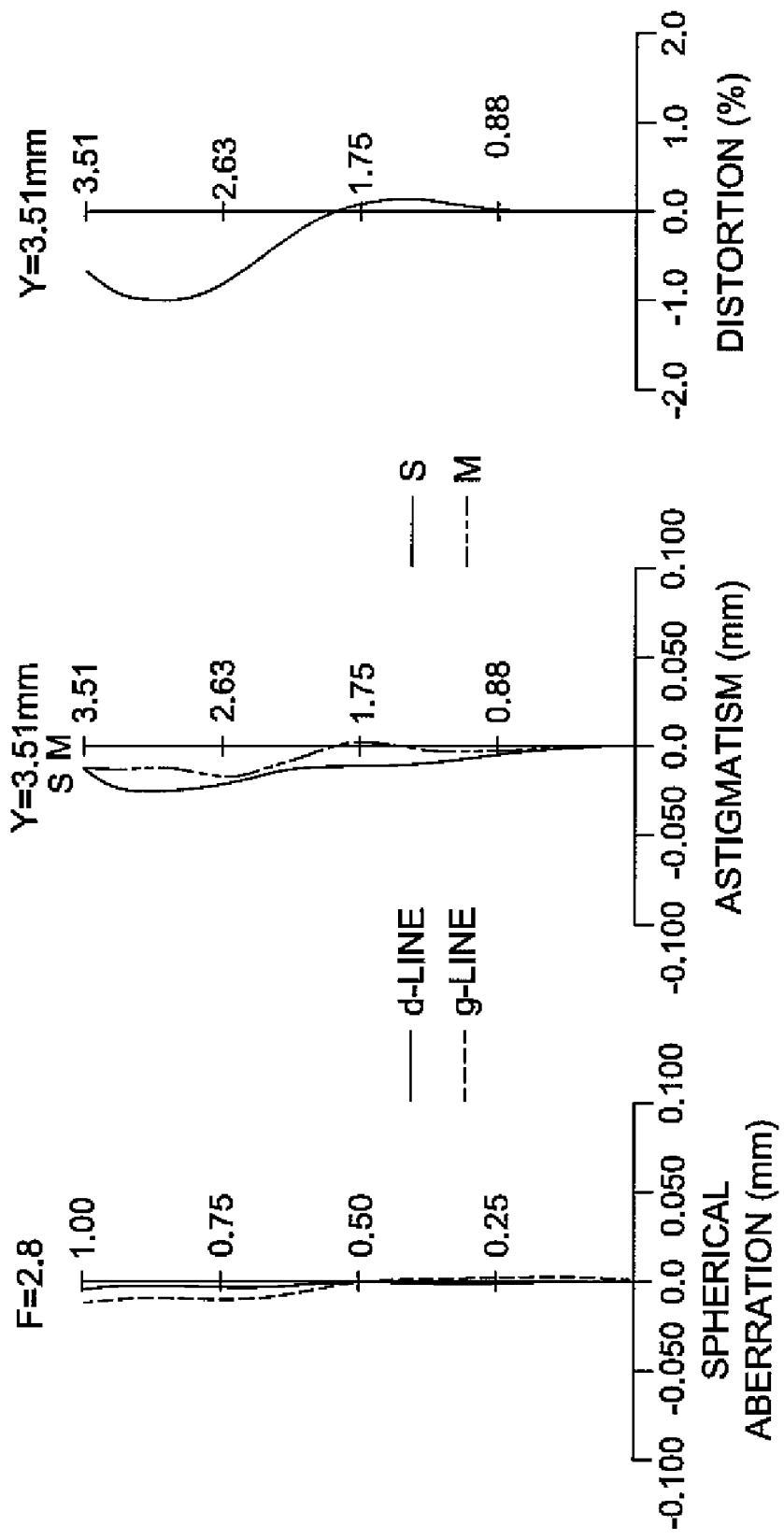

IMAGING LENS AND SMALL-SIZE IMAGE PICKUP APPARATUS USING THE SAME

This application is based on Japanese Patent Application No. 2008-219698 filed on Aug. 28, 2008, in Japanese Patent Office, the entire content of which is hereby incorporated by reference.

TECHNICAL FIELD

The present invention relates to an imaging lens for a small-size image pickup apparatus using solid state image pickup device, such as a CCD (Charge Coupled Devices) type image sensor and a CMOS (Complementary Metal-Oxide Semiconductor) type image sensor, and the small-size image pickup apparatus using the same.

BACKGROUND

A compact and thin small-size image pickup apparatus using a solid state image pickup device, such as a CCD type image sensor and a CMOS type image sensor, has come to be mounted on a portable terminal, which is a compact and thin electronic device, such as a mobile phone and PDA (Personal Digital Assistant). Thereby, a mutual transmission of not only voice information but also image information to a remote place has become possible. With such small-size image pickup apparatus, there is a strong demand for both miniaturization and high definition, which realizes such image quality that user expect.

The small-size image pickup apparatus is mainly composed of a solid state image pickup device and an imaging lens. Although a solid state image pickup device the solid state image pickup device that having approximately five million pixels is already in the market to realize high definition, it has typically a comparatively large sensor size because it is used for a digital camera. However, recently, a pixel number has been increased due to the improvement in production technology, and a satisfactorily miniaturized solid state image pickup device having a large number of pixels has been developed. Therefore, the solid state image pickup device can be applied to the small-size image pickup apparatus.

On the other hand, as disclosed in U.S. Pat. No. 6,795,253, there has appeared a lens whose aberration is improved in response to increase in definition of this image pickup device.

Incidentally, in the case where such lens as disclosed in U.S. Pat. No. 6,795,253 is employed in a small-size image pickup apparatus of high definition, it should be further considered that there is a demand for high resolution. Here, for example, the aberration caused by an optical axis shift between individual lenses can be considered as a factor that affects resolution. However, in this case, since a further reduction of the manufacture error causes the manufacturing cost to increase, the optical axis shift may be reduced by aligning the individual lens. However, in the case of the small-size image pickup apparatus, whole alignment mechanism cannot be incorporated in the lens for the reasons: there is a limitation of space, and the alignment needs to be efficiently performed in order to improve the productivity for cost reduction.

SUMMARY

In view of forgoing, one embodiment according to one aspect of the present invention is an image pickup lens system, for a small-size image pickup apparatus, for forming an image of a subject on a photoelectrical conversion section of a solid state image pickup device, the lens system comprising, in order from an object side:

a positive first lens which is movable in a direction perpendicular to an optical axis thereof;
a diaphragm; and
a rear lens group.

According to another aspect of the present invention, another embodiment is a small-size image pickup apparatus, comprising:

an image pickup device; and
an image pickup lens system for forming an image of a subject on a photoelectrical conversion section of the solid state image pickup device, the lens system including in order from an object side:

a positive first lens which is movable in a direction perpendicular to an optical axis thereof;
a diaphragm; and
a rear lens group.

BRIEF DESCRIPTION OF THE DRAWINGS

FIGS. 3a and 3b illustrate a state in which the small-size image pickup apparatus 50 has been mounted onto a mobile phone 100 serving as a portable terminal;

FIG. 8a is an aberration figure illustrating a spherical aberration of the imaging lens pertaining to the second example;

FIG. 8b is an aberration figure illustrating astigmatism of the imaging lens pertaining to the second example;

FIG. 8c is an aberration figure illustrating a distortion of an imaging lens pertaining to the second example;

FIG. 12a is an aberration figure illustrating a spherical aberration of the imaging lens pertaining to the forth example;

FIG. 12b is an aberration figure illustrating astigmatism of the imaging lens pertaining to the forth example;

FIG. 12c is an aberration figure illustrating a distortion of the imaging lens pertaining to the forth example;

FIG. 18a is an aberration figure illustrating a spherical aberration of the imaging lens pertaining to the seventh example;

FIG. 18b is an aberration figure illustrating astigmatism of the imaging lens pertaining to the seventh example;

FIG. 18c is an aberration figure illustrating a distortion of the imaging lens pertaining to the seventh example.

DETAILED DESCRIPTION OF THE PREFERRED EMBODIMENT

Figure 1:
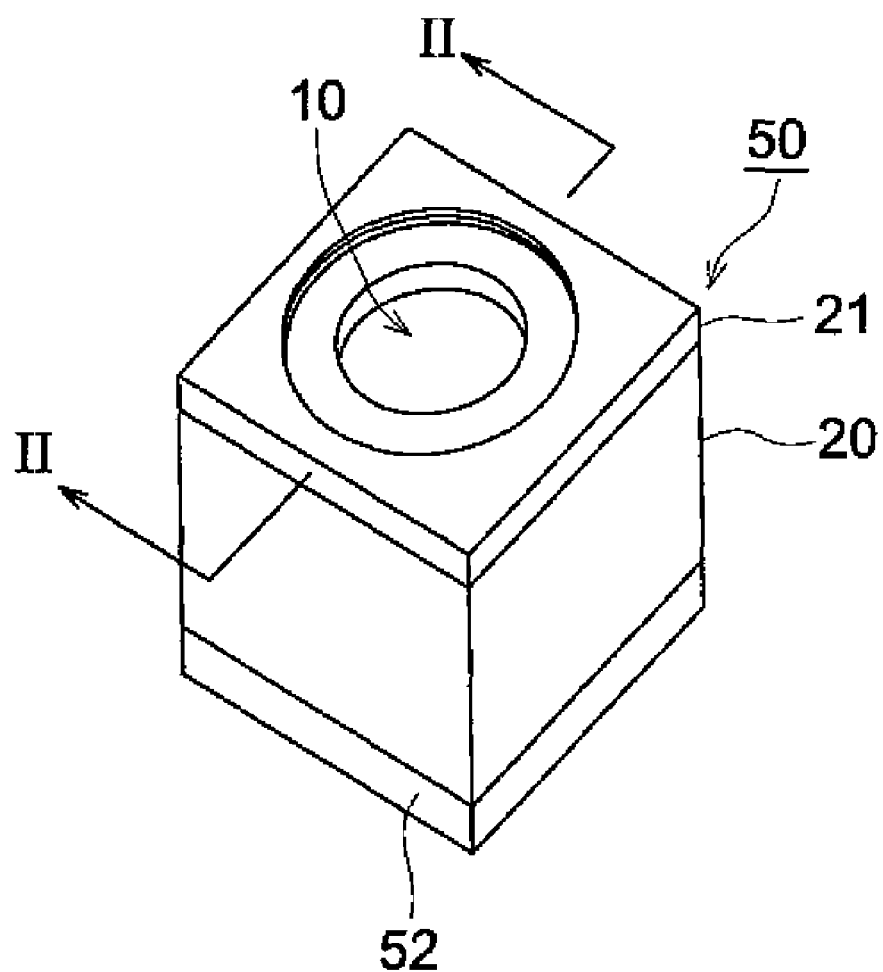
FIG. 1 illustrates a perspective view of a small-size image pickup apparatus 50 pertaining to an embodiment of the present invention.
Figure 2:
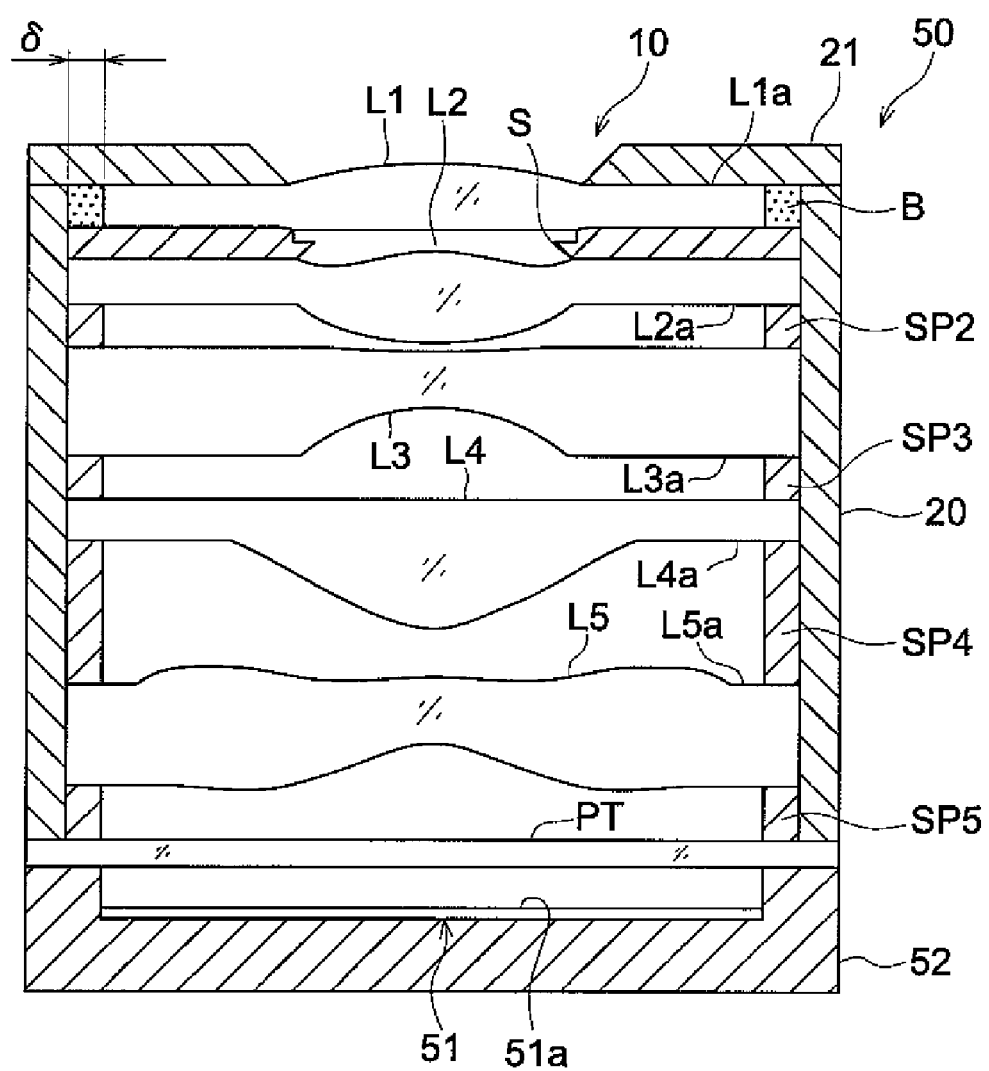
FIG. 2 illustrates a sectional view, of the configuration of FIG. 1, cut along the arrow II-II and viewed in the direction of the arrows.

Hereinafter, embodiments of the present invention will be described based on the drawings. FIG. 1 illustrates a perspective view of a small-size image pickup apparatus 50 pertaining to an embodiment of the present invention. FIG. 2 illustrates a sectional view of the configuration shown in FIG. 1, which has been cut at the line of arrow II-II, and viewed in the direction of the arrows. As illustrated in FIG. 2, the small-size image pickup apparatus 50 is configured of a CMOS type image sensor 51 serving as a solid state image pickup device having a photoelectric conversion section 51a, an imaging lens 10 that enables the photoelectric conversion section 51a of this image sensor 51 to take a subject image, and a substrate 52 having a terminal for external connection (not illustrated) that sends and receives an electric signal and holding the image sensor 51. Further, the CMOS type image sensor 51, the imaging lens 10 and the substrate 52 are formed into one body.

In the above mentioned image sensor 51, the photoelectric conversion section 51a serving as a light receiving section on which a pixel (photoelectric conversion element) is two-dimensionally arranged at the central portion of the plane surface on the light receiving side. Then, the above mentioned image sensor 51 is connected to the un-illustrated signal processing circuit. This signal processing circuit is configured of a driving circuit section that drives each pixel one after another and receives a signal electric charge, an A/D conversion section that converts each signal electric charge into a digital signal and a signal processing section that forms an image signal output using this digital signal. A number of pads (not illustrated) are arranged near the rim of the plane surface on the light receiving side of the image sensor 51 and are connected to the substrate 52 via the un-illustrated wires. The image sensor 51 converts the signal electric charge from the photoelectric conversion section 51a into an image signal such as a digital YUV signal, and outputs the image signal to a predetermined circuit on the substrate 52 via the wires (un-illustrated). Here, "Y" is a luminance signal, "U (=R−Y)" is a color difference signal of red and the luminance signal, and "V (=B−Y)" is a color difference signal of blue and the luminance signal. The solid state image pickup device is not limited to the above-mentioned CMOS type image sensor, and may be other image sensor such as a CCD.

The substrate 52, which supports the image sensor 51, is connected to the image sensor 51 via the unillustrated wirings so as to communicate with each other.

The substrate 52 is connected to an external circuit (for example, a control circuit of a higher level device of a portable terminal on which an image pickup apparatus is mounted) via an un-illustrated terminal for external connection. Through the substrate 52, the small image pickup apparatus 50 receives the supply of the voltage and a clock signal from the external circuit for driving the image sensor 51, and outputs the digital YUV signal to the external circuit.

The upper section of the image sensor 51 is sealed with a plate PT, such as an infrared cut filter fixed onto the upper surface of the substrate 52. A rectangle tubular (or a cylindrical) lens frame 20 is fixed on the circumference of the upper surface of the plate PT at its lower end. The imaging lens 10 is disposed inside the lens frame 20. The imaging lens 10 is configured of a positive first lens L1, a aperture diaphragm S, a positive second lens L2, a negative third lens L3, a positive fourth lens L4 and a negative fifth lens L5 in this order from the object side (upper section in FIG. 2).

A spacer SP5 is arranged between a flange section L5a of the fifth lens L5 and the plate PT. A spacer SP4 is arranged between a flange section L4a of the fourth lens L4 and the flange section L5a of the fifth lens L5. A spacer SP3 is arranged between a flange section L3a of the third lens L3 and the flange section L4a of the fourth lens L4. A spacer SP2 is arranged between a flange section L2a of the second lens L2 and the flange section L3a of the third lens L3. A doughnut shaped aperture diaphragm S also functioning as a spacer is arranged between a flange section L1a of the first lens L1 and the flange section L2a of the second lens L2. Thereby, the distance between lenses can be arranged with sufficient accuracy. The flange section L1a of the first lens L1 is covered with a doughnut disk shaped lid member 21 adhered on the upper end of the lens frame 20.

The outer diameters of spacers SP2-SP5, lens L2-L5 and aperture diaphragm S have a dimension that makes the space between these elements and the inner wall of a lens frame 20 be approximately zero in at least two directions perpendicular to the optical axis. Therefore, these elements cannot be displaced in the direction perpendicular to the optical axis. However, between the perimeter of the first lens L1 and the lens frame 20, there is formed a space, the first lens L1 is arranged to be displaceable in at least two ways in the direction perpendicular to the optical axis with respect to the lens frame 20, until the first lens L1 gets fixed. In the imaging lens 10, the first lens L1 has the highest error sensitivity and it has a smaller outer diameter than the other lenses. Therefore, a space can be used effectively when the alignment mechanism, which can displace a lens L1 in the direction perpendicular to the optical axis, is incorporated into the space between the lens frame 20 and the first lens. Thus, the increase in size of the small-size image pickup apparatus is controlled even when the imaging lens 10 is built into the small-size image pickup apparatus. Since only the lens L1 of the foremost side (object side) is aligned, the adjustment can be performed after all lens parts are built in, whereby the efficiency of the production process will be increase. This space is preferably about 10% of the lens outer diameter at most.

In the embodiments of the present invention, the following conditional expression is satisfied when parallel eccentricity sensitivity at the 70 percent image height of the first lens L1 is assumed as E.

$$1 < |E| < 5 \quad (1)$$

Where, the parallel eccentricity sensitivity E is a value expressed by E=ΔM/δ when an eccentricity value of the lens in the direction perpendicular to the optical axis of the above-mentioned imaging lens is assumed to be δ, and the deviation of the meridional image surface is assumed to be ΔM. The image height of 70 percent is a height that is 70 percent of one half of the diagonal length of a rectangular effective pixel area of the solid state image pickup device (that is, diagonal length×0.35).

At the time of assembling the small-size image pickup apparatus 50, after the lens frame 20 is attached onto the plate PT covering the CMOS type image sensor 51, the spacer SP5, the fifth lens L5, the spacer SP4, the fourth lens L4, the spacer SP3, the third lens L3, the spacer SP2 and the aperture diaphragm S are inserted into the lens frame 20. Further, the first lens L1 is placed on the aperture diaphragm, and while monitoring the signal from the CMOS type image sensor 51, the first lens L1 is aligned by displacing it in the direction perpendicular to the optical axis in the lens frame 20. When the error falls within the tolerance, the space δ is filled with adhesive B to fix the first lens L1. Further, the lid member 21 is adhered on the lens frame 20. It should be noted that the form of assembling is not limited thereto.

Figure 4:
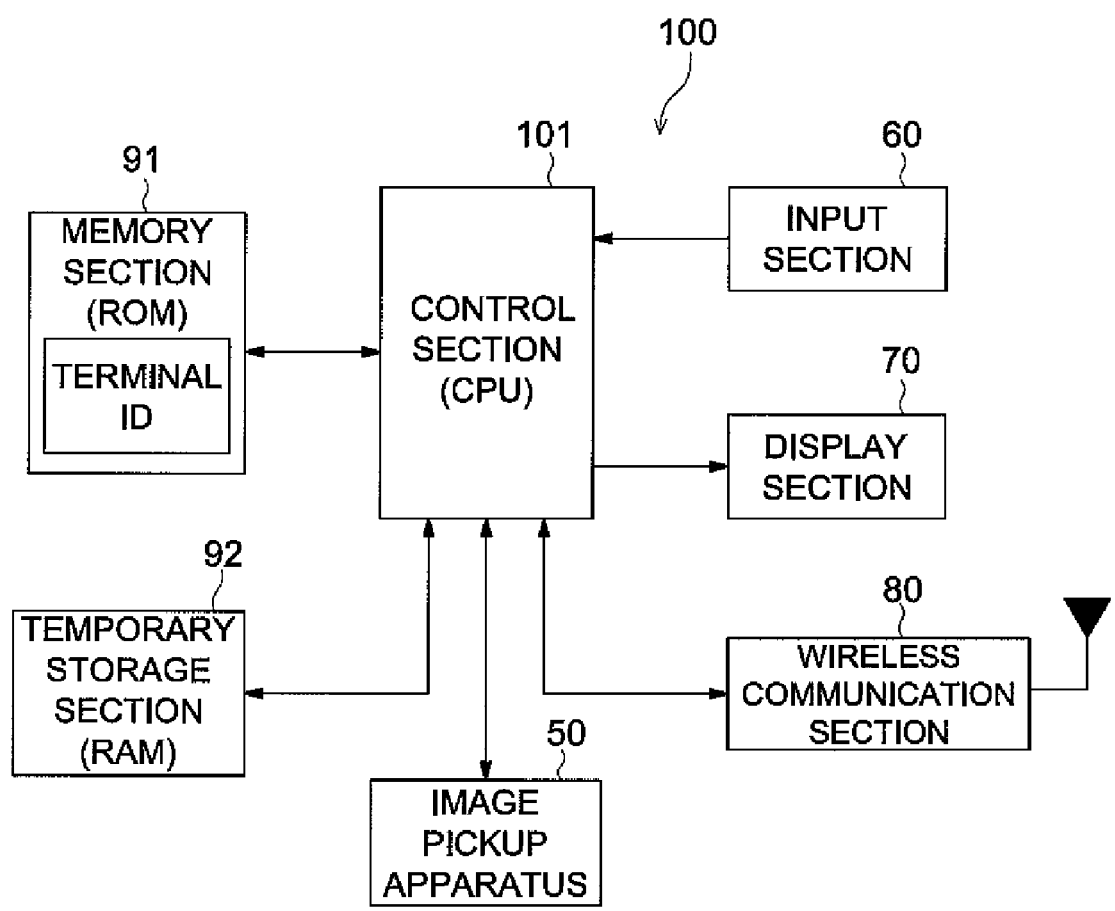
FIG. 4 illustrates a control block diagram of the mobile phone 100.

Next, an operation mode of the above mentioned small-size image pickup apparatus 50 will be described. FIGS. 3*a* and 3*b* illustrate a state in which the small-size image pickup apparatus 50 is equipped in a mobile phone 100 serving as a portable terminal, which is digital equipment. FIG. 4 illustrates a block diagram of the control of the mobile phone 100.

For example, the small-size image pickup apparatus 50 is disposed at a position below a liquid crystal display section on the mobile phone 100 such that the object side end surface of the imaging lens is on the back side of the mobile phone 100 (assuming the liquid crystal display section side to be front).

A terminal for external connection (un-illustrated) of the small-size image pickup apparatus 50 is connected to a control section 101 of the mobile phone 100. The terminal for external connection (un-illustrated) of the small-size image pickup apparatus 50 outputs the image signal, such as a luminance signal and a color difference signal, to the control section 101.

Meanwhile, as illustrated in FIG. 4, the mobile phone 100 is configured of a control section (CPU) 101 for totally controlling each section and simultaneously executing a program corresponding to each process, an input section 60 for inputting a number through keys, a display section 70 for displaying photographed images and pictures, a wireless communication section 80 for realizing various information communications to external servers, a memory section (ROM) 91 for memorizing various required data of the system program, various processing programs and terminal ID of the mobile phone 100 and a temporary storage section (RAM) 92 used as a workspace that temporarily stores the various processing programs and data executed by the control section 101, or picked-Up image data from the small-size image pickup apparatus 50 and processing data.

When a photographing person who holds the mobile phone 100 points the imaging lens 10 of the small-size image pickup apparatus 50 at a photographic subject, the image signal of a still picture or a moving image is taken into the image sensor 51. The shutter is released when the photographing person presses a button BT illustrated in FIGS. 3*a* and 3*b* at a desired photo opportunity. Then the image signal is taken into the small image-pick apparatus 50. The image signal inputted from the small-size image pickup apparatus 50 is transmitted to the control system of the above-mentioned mobile phone 100, and memorized in the memory section 92 or displayed on the display section 70. Furthermore, the image signal is transmitted outside as image information through the wireless communication section 80.

The present invention has been conceived by the inventers focusing on the fact that that the first lens generally has the highest error sensitivity in the imaging lens of the small-size image pickup apparatus of the conventional arts, and on the diameter of the first lens is relatively smaller than the diameter of the other lenses. More concretely, in the embodiment, the lens alignment is performed by displacing the first lens having the high error sensitivity in the direction perpendicular to the optical axis. Therefore, the lens alignment becomes easier to perform, and whereby the adjustment can be performed precisely in a short time. The lens alignment can be performed after all optical systems are assembled. Further, in the case where a mechanism for lens alignment is incorporated in the circumference of the first lens, there is an advantage that the size of the whole imaging lens does not become large.

Generally, the lenses which sandwich the aperture diaphragm therebetween, tend to have a high error sensitivity to manufacturing errors. To address this issue, in the embodiment of the present invention, only the above mentioned positive first lens is arranged on the object side of the above-mentioned aperture diaphragm. This arrangement ensures the lens to be easily adjusted, and the parallel eccentricity sensitivity set within the range of a conditional relationship (1) realizes a high resolution. Here, when the parallel eccentricity sensitivity E is equal to or lower than the lower limit of the conditional relationship (1), the advantage of the above mentioned first lens becomes smaller, and the advantage becomes harder to be exerted. On the other hand, when the parallel eccentricity sensitivity E is equal to or greater than the upper limit of the conditional relationship (1), the parallel eccentricity sensitivity of the above mentioned first lens becomes larger than the mechanical adjustment accuracy. As a result, the adjustment effect cannot be exerted. Therefore, it is preferred for E to satisfy the conditional relationship (1). It is more desirable for E to satisfy the range of the relationship below.

$$1.1 < |E| 4 \quad (1A)$$

In an embodiment of the present invention, a rear lens group contains at least one negative lens. The Petzval Sum is easy to adjust due to the effect of the surface having a divergence effect, and by including at least one negative lens in a rear lens group, it becomes possible to secure a satisfactory image formation capability even in the periphery of the imaging area.

In an embodiment of the present invention, the negative lens is arranged on the most image side of the above-mentioned rear lens group. With a negative lens arranged on the most image side, a telephoto type is realized, and thereby overall length of the lens can be shortened.

According to an embodiment of the present invention, there can be provided an imaging lens and a small-size image pickup apparatus which have a high resolution by adjusting an appropriate lens in the direction perpendicular to the optical axis.

EXAMPLES

Next, preferable examples of the above mentioned embodiment will be described. However, the present invention is not limited to the examples described below. The meaning of each code in the examples is as follows.

f: Focal length of the whole imaging lens system
fB: Back focus
F: F number
2Y: Diagonal length of the image pickup surface of the solid state image pickup device
R: Curvature radius
D: On-axis surface interval
Nd: Refractive index lens material at D-line
vd: Abbe number of lens material In each example, a surface whose surface number is accompanied with "*" is aspherical. The form of the aspherical surface is expressed by Equation 1, where the peak of the surface is assumed to be a point of origin, the optical axis direction to be the X-axis, and the height in the direction perpendicular to the optical axis as h. Hereinafter (including the lens data on the tables), ten's power (for example, 2.5× $10^{-02}$) is expressed using E (for example, 2.5 E−02).

$$X = \frac{h^2/R}{1+\sqrt{1-(1+K)h^2/R^2}} + \sum A_i h^i \quad \text{[Equation 1]}$$

Where
Ai: Aspherical surface coefficient of i-th order
a: Curvature radius
K: Conical constant

First Example

Figure 5:
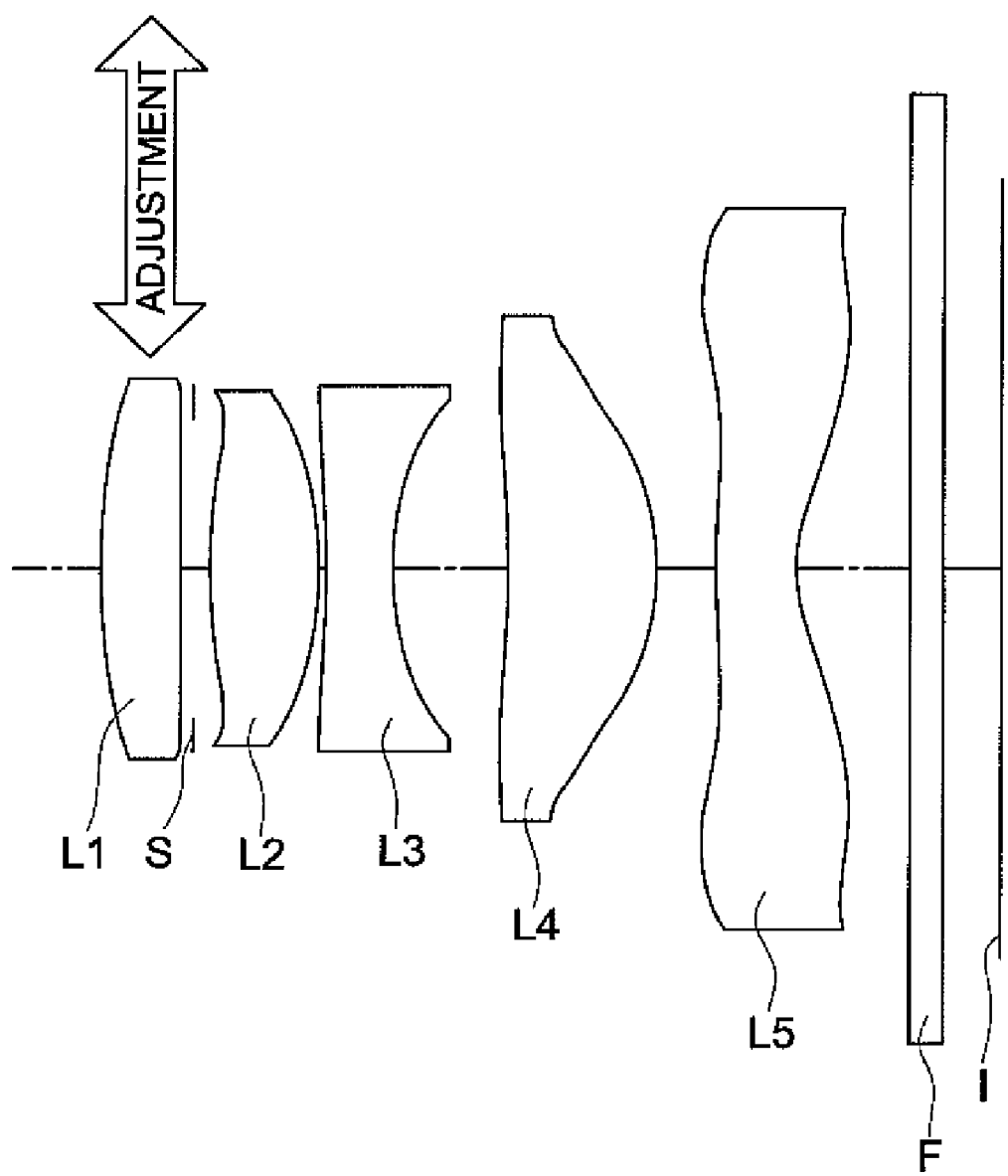
FIG. 5 illustrates a sectional view of an imaging lens of a first example.
Figure 6:
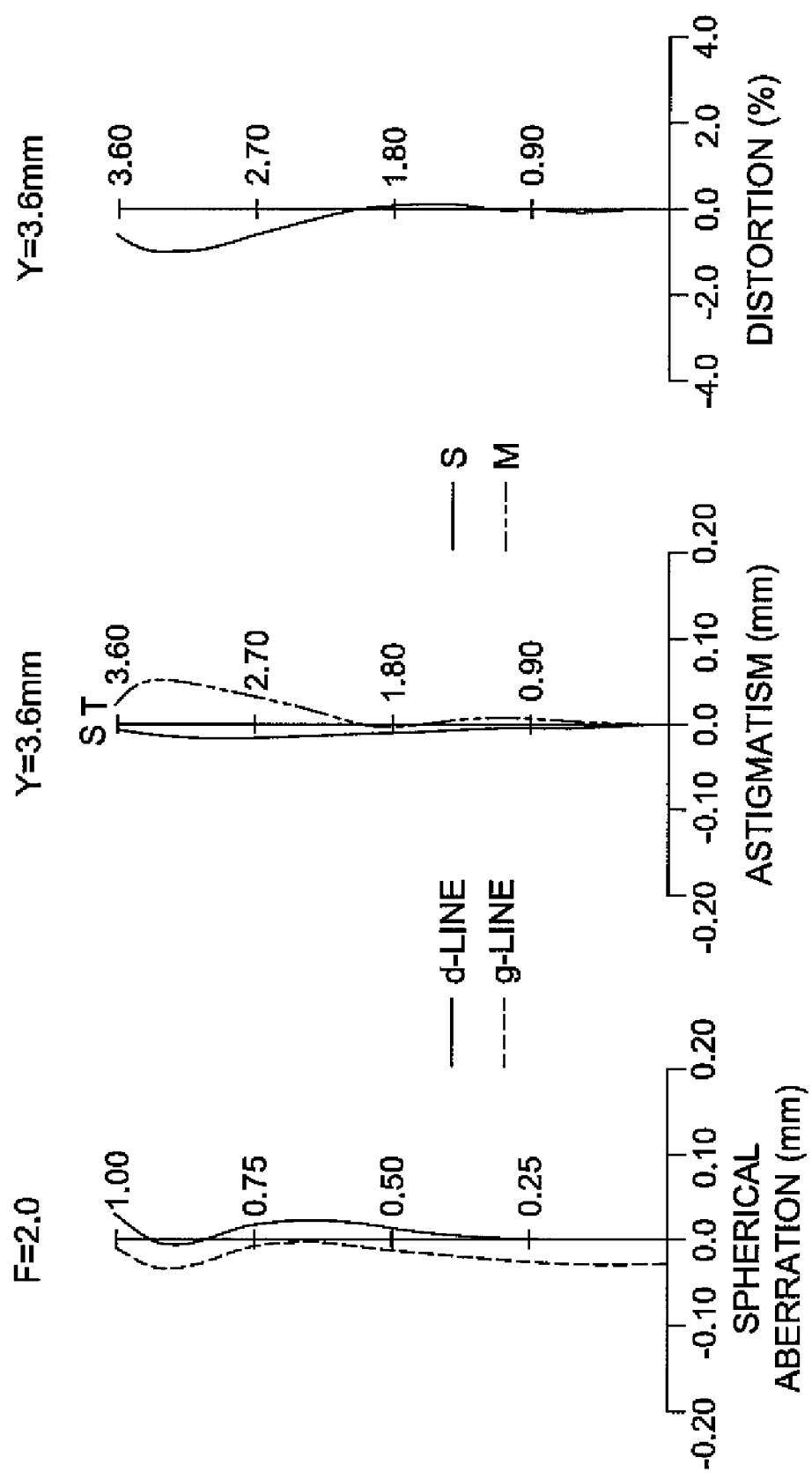
FIG. 6a is an aberration figure illustrating a spherical aberration of the imaging lens pertaining to the first example.
FIG. 6b is an aberration figure illustrating astigmatism of the imaging lens pertaining to the first example.
FIG. 6c is an aberration figure illustrating a distortion of the imaging lens pertaining to the first example.

The lens data of the first example is illustrated in Table 1. FIG. 5 illustrates a sectional view of an imaging lens of the first example. In the drawing, L1 indicates a positive first lens that can be adjusted in the direction perpendicular to the optical axis, L2 indicates a positive second lens, L3 indicates a negative third lens, L4 indicates a positive fourth lens, L5 indicates a negative fifth lens on the most image side, S indicates an aperture diaphragm arranged between L1 and L2, and "I" indicates an image pickup surface. The rear lens group is the lenses L2-L5. F indicates a parallel plate assumed to be an optical low pass filter, an IR cut filter and a seal glass of a solid state image pickup device. FIGS. 6a, 6b and 6c illustrate aberration figures showing a spherical aberration, astigmatism and distortion of the imaging lens applied to first example, respectively. Here, in the spherical aberration figure, g expresses the spherical aberration amount with respect to the g-line, and d expresses the spherical aberration amount with respect to the d-line. In the astigmatism figure, a solid line S illustrates a sagittal surface, and a two-dot chain line M illustrates a meridional surface. In the first example, when the eccentricity amount Δ of the first lens L1 is 10 μm, the deviation amount ΔM of the meridional image surface is 12 μm, and the parallel eccentricity sensitivity |E|=1.2.

TABLE 1

First example
f = 5.910 mm fB = 0.536 mm F = 2.0 2Y = 7.2 mm

| Surface number | R (mm) | D (mm) | Nd | vd |
|---|---|---|---|---|
| 1* | 6.603 | 0.688 | 1.5305 | 55.7 |
| 2* | −44.176 | 0.100 | | |
| 3 (aperture diaphragm) | ∞ | 0.152 | | |

TABLE 1-continued

| | | | | |
|---|---|---|---|---|
| 4* | 6.390 | 0.977 | 1.5305 | 55.7 |
| 5* | −4.395 | 0.050 | | |
| 6* | 42.925 | 0.600 | 1.5834 | 30.2 |
| 7* | 2.268 | 1.020 | | |
| 8* | −14.845 | 1.331 | 1.5305 | 55.7 |
| 9* | −1.779 | 0.531 | | |
| 10* | 8.019 | 0.715 | 1.5305 | 55.7 |
| 11* | 1.595 | 1.000 | | |
| 12 | ∞ | 0.300 | 1.5168 | 64.2 |
| 13 | ∞ | | | |

Aspherical surface coefficient

First surface

K = 0.14048E+01
A4 = −0.70966E−02
A6 = 0.10360E−02
A8 = 0.89534E−03
A10 = −0.29188E−03

Second surface

K = 0.49085E+03
A4 = 0.11452E−03
A6 = 0.45589E−02
A8 = 0.42466E−03
A10 = −0.54884E−03

Fourth surface

K = 0.50000E+01
A4 = −0.17082E−02
A6 = 0.16256E−03
A8 = −0.22519E−02
A10 = 0.11262E−02
A12 = −0.63708E−03

Fifth surface

K = −0.14947E+01
A4 = −0.25253E−02
A6 = −0.69692E−02
A8 = 0.19263E−02
A10 = −0.39357E−03
A12 = −0.11786E−03

Sixth surface

K = −0.50000E+02
A4 = −0.28085E−01
A6 = 0.24172E−02
A8 = 0.25930E−02
A10 = −0.38613E−03

Seventh surface

K = −0.22790E+01
A4 = −0.10809E−01
A6 = 0.41003E−02
A8 = 0.38893E−03
A10 = 0.18077E−03
A12 = −0.66114E−04

Eighth surface

K = 0.25321E+02
A4 = 0.15881E−01
A6 = −0.61505E−02
A8 = 0.12926E−02
A10 = −0.13488E−03
A12 = 0.13432E−04

Ninth surface

K = −0.40392E+01
A4 = −0.15076E−01
A6 = 0.27224E−02
A8 = −0.59535E−03
A10 = 0.11365E−03
A12 = −0.33434E−05

Tenth surface

K = 0.18663E+01
A4 = −0.37350E−01
A6 = 0.45514E−02
A8 = −0.10252E−03

TABLE 1-continued

| | |
|---|---|
| A10 = | −0.94808E−05 |
| A12 = | 0.41864E−06 |
| Eleventh surface | |
| K = | −0.49193E+01 |
| A4 = | −0.23372E−01 |
| A6 = | 0.32737E−02 |
| A8 = | −0.33571E−03 |
| A10 = | 0.18959E−04 |
| A12 = | −0.32549E−06 |

Elemental Lens Data

| Lens | Starting surface | Focal length (mm) |
|---|---|---|
| 1 | 1 | 10.880 |
| 2 | 4 | 5.068 |
| 3 | 6 | −4.127 |
| 4 | 8 | 3.680 |
| 5 | 10 | −3.903 |

Second Example

Figure 7:
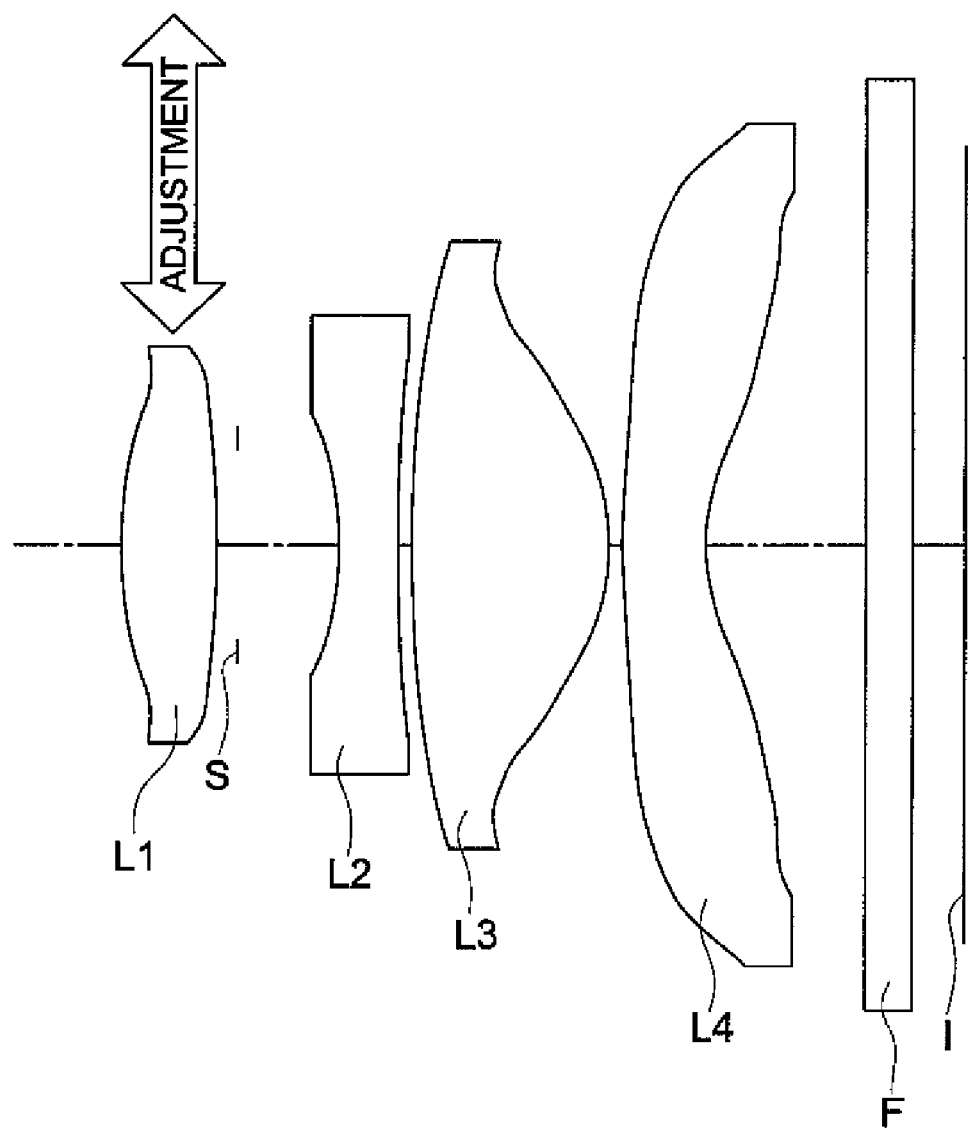
FIG. 7 illustrates a sectional view of an imaging lens of a second example.

The lens data of a second example is illustrated in Table 2. FIG. 7 illustrates a sectional view of the imaging lens of the second example. In the drawing, L1 indicates a positive first lens that can be adjusted in the direction perpendicular to the optical axis, L2 indicates a positive second lens, L3 indicates the negative third lens, L4 indicates a positive fourth lens on the most image side, S indicates an aperture diaphragm arranged between L1 and L2, and I indicates the image pickup surface. The rear lens group is the lenses L2-L4. F indicates a parallel plate assumed to be an optical low pass filter, an IR cut filter and a seal glass of a solid state image pickup device. FIGS. 8a, 8b and 8c illustrate aberration figures showing the spherical aberration, the astigmatism and the distortion of the imaging lens of the second example, respectively. Here, in the spherical aberration figure, g expresses a spherical aberration amount with respect to the g-line, and d expresses the spherical aberration amount with respect to the d-line. In the astigmatism figure, the solid line S illustrates the sagittal surface, and the two-dot chain line "M" illustrates the meridional surface. In the second example, when the eccentricity amount Δ of the first lens L1 is 10 μm, the deviation amount ΔM of the meridional image surface is 17 μm, and the parallel eccentricity sensitivity |E|=1.7.

TABLE 2

Second example
f = 5.712 mm fB = 0.508 mm F = 2.8 2Y = 7.2 mm

| Surface number | R (mm) | D (mm) | Nd | νd |
|---|---|---|---|---|
| 1* | 3.711 | 0.935 | 1.5891 | 61.2 |
| 2* | −68.895 | 0.210 | | |
| 3 (aperture diaphragm) | ∞ | 1.018 | | |
| 4* | −2.783 | 0.600 | 1.5834 | 30.2 |
| 5* | 20.891 | 0.117 | | |
| 6* | 9.637 | 1.996 | 1.5305 | 55.7 |
| 7* | −1.370 | 0.100 | | |
| 8* | 5.070 | 0.850 | 1.5305 | 55.7 |
| 9* | 1.258 | 1.564 | | |
| 10 | ∞ | 0.500 | 1.5168 | 64.2 |
| 11 | ∞ | | | |

TABLE 2-continued

| | |
|---|---|
| Aspherical surface coefficient | |
| First surface | |
| K = | −0.97854E+00 |
| A4 = | −0.15969E−02 |
| A6 = | −0.21045E−02 |
| A8 = | 0.17323E−03 |
| A10 = | −0.33270E−03 |
| Second surface | |
| K = | 0.50000E+01 |
| A4 = | −0.97649E−02 |
| A6 = | −0.29440E−02 |
| A8 = | −0.40171E−03 |
| Fourth surface | |
| K = | 0.19722E+01 |
| A4 = | 0.15382E−02 |
| A6 = | 0.12902E−02 |
| A8 = | 0.27437E−02 |
| Fifth surface | |
| K = | −0.10000E+02 |
| Sixth surface | |
| K = | −0.10000E+02 |
| Seventh surface | |
| K = | −0.35797E+01 |
| A4 = | 0.24416E−01 |
| A6 = | 0.40324E−02 |
| A8 = | −0.12267E−03 |
| A10 = | 0.18274E−04 |
| A12 = | −0.15073E−05 |
| Eighth surface | |
| K = | −0.30000E+01 |
| A4 = | −0.24693E−01 |
| A6 = | 0.39743E−02 |
| A8 = | −0.27056E−03 |
| A10 = | 0.10230E−04 |
| A12 = | −0.16519E−06 |
| Ninth surface | |
| K = | −0.47297E+01 |
| A4 = | −0.14574E−01 |
| A6 = | 0.14587E−02 |
| A8 = | −0.10113E−03 |
| A10 = | 0.49508E−05 |
| A12 = | −0.19133E−07 |

Elemental Lens Data

| Lens | Starting surface | Focal length (mm) |
|---|---|---|
| 1 | 1 | 6.006 |
| 2 | 4 | −4.171 |
| 3 | 6 | 2.413 |
| 4 | 8 | −3.419 |

Third Example

Figure 9:
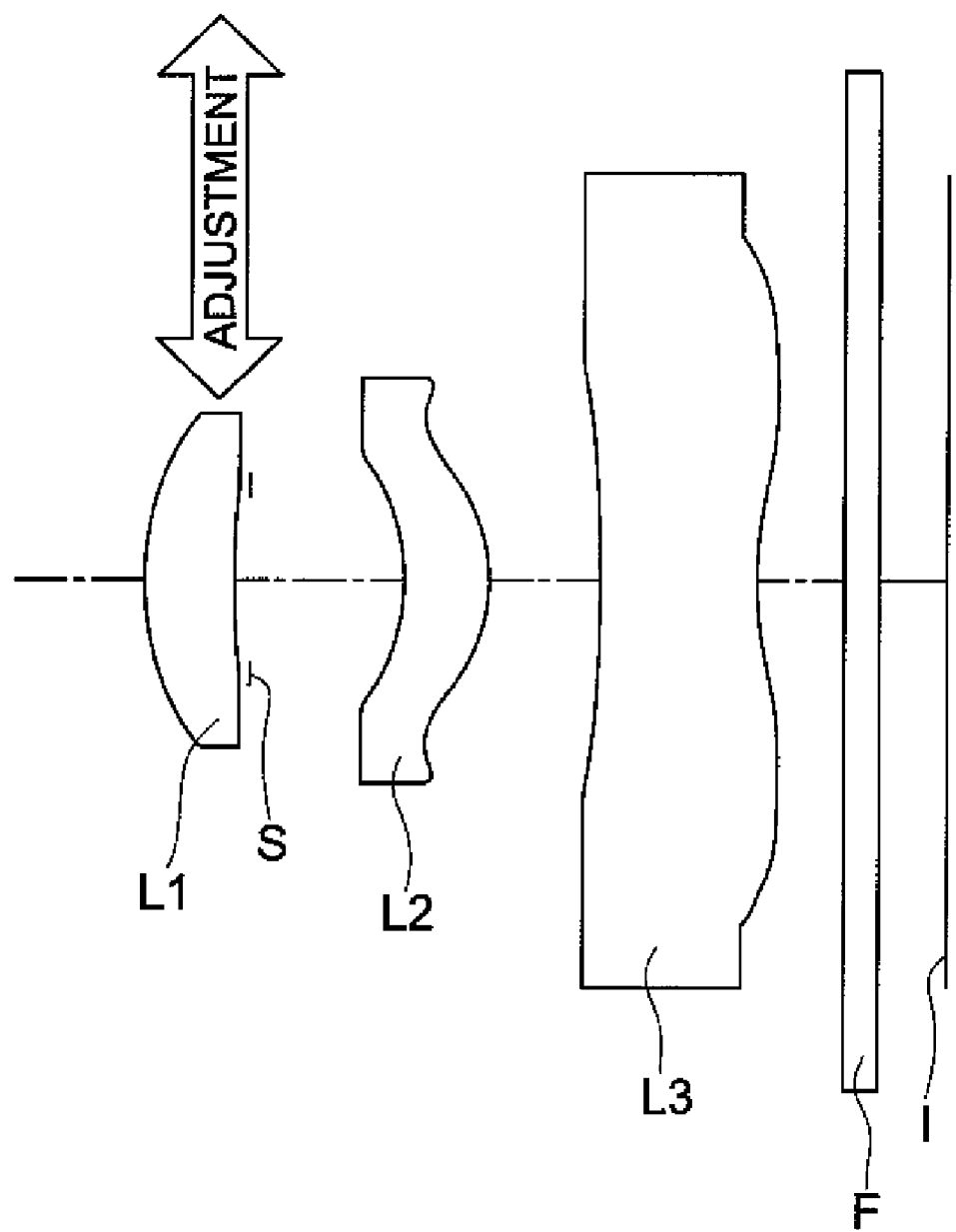
FIG. 9 is a sectional view illustrating an imaging lens of a third example.
Figure 10:
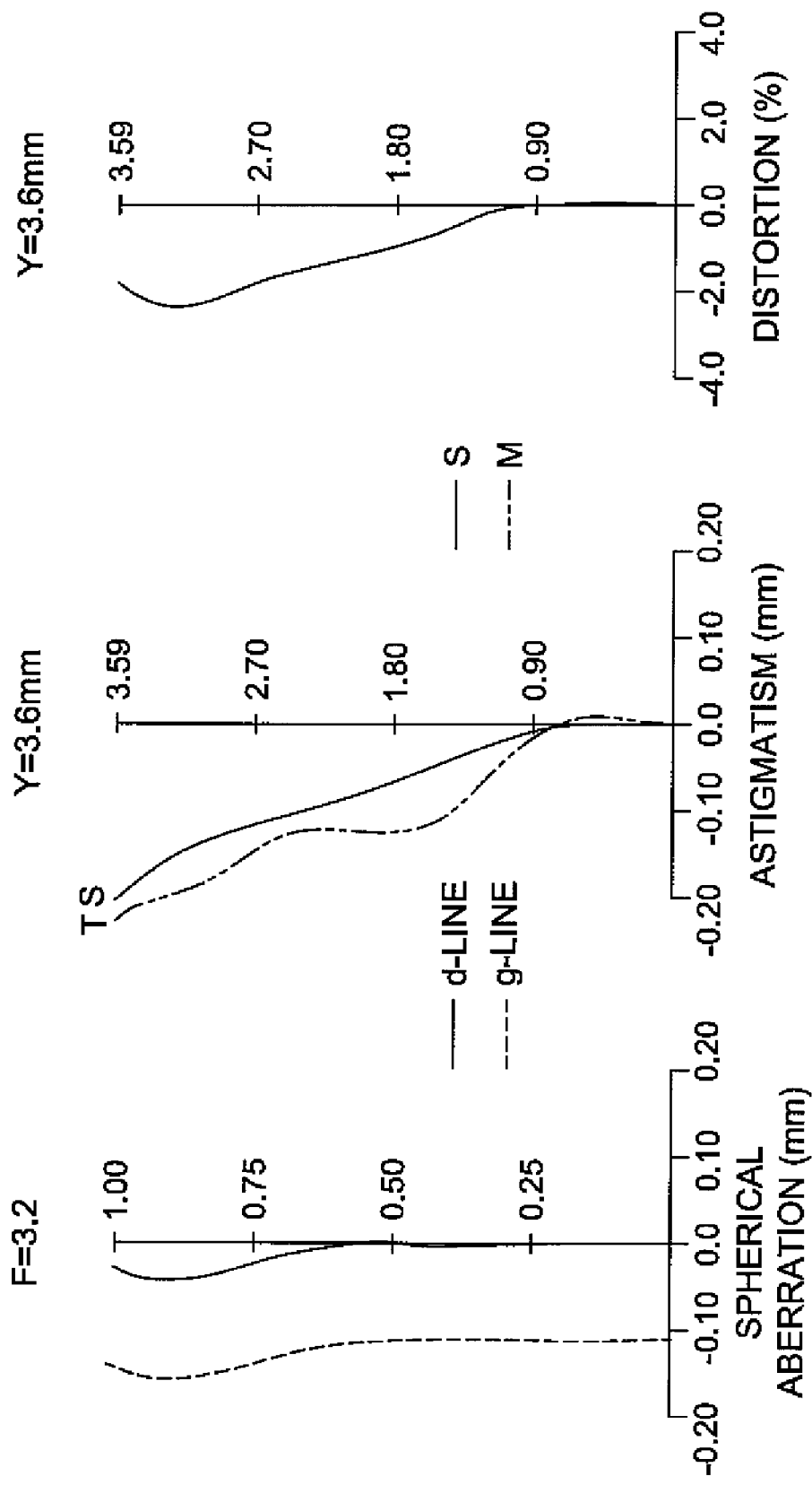
FIG. 10a is an aberration figure illustrating a spherical aberration of the imaging lens pertaining to the third example.
FIG. 10b is an aberration figure illustrating astigmatism of the imaging lens pertaining to the third example.
FIG. 10c is an aberration figure illustrating a distortion of the imaging lens pertaining to the third example.

The lens data of the third example is illustrated in Table 3. FIG. 9 illustrates a sectional view of the imaging lens of the third example. In the drawing, L1 indicates a positive first lens that can be adjusted in the direction perpendicular to the optical axis, L2 indicates a positive second lens, L3 indicates a negative third lens on the most image side, S indicates an aperture diaphragm arranged between L1 and L2, and I indicates the image pickup surface. The rear lens group is the lenses L2-L3. F is a parallel plate assumed to be the optical low pass filter, an IR cut filter and a seal glass of a solid state image pickup device. FIGS. 10a, 10b and 10c illustrate aberration figures showing the spherical aberration, the astigmatism and the distortion of the imaging lens applied to the third example, respectively. Here, in the spherical aberration figure, g expresses the spherical aberration amount at the g-line, and d expresses the spherical aberration amount at the d-line. In the astigmatism figure, the solid line S expresses the sagittal surface, and the two-dot chain line M expresses the meridional surface. In the third example, when the eccentricity amount Δ of the first lens L1 is 10 μm, the deviation amount ΔM of the meridional image surface is 24 μm, and the parallel eccentricity sensitivity |E|=2.4.

TABLE 3

Third example
f = 5.714 mm fB = 0.583 mm F = 3.2 2Y = 7.2 mm

| Surface number | R (mm) | D (mm) | Nd | vd |
|---|---|---|---|---|
| 1* | 2.709 | 0.774 | 1.5305 | 55.7 |
| 2* | 23.012 | 0.096 | | |
| 3 (aperture diaphragm) | ∞ | 1.326 | | |
| 4* | −1.651 | 0.736 | 1.5305 | 55.7 |
| 5* | −1.313 | 0.928 | | |
| 6* | −12.337 | 1.347 | 1.5834 | 30.2 |
| 7* | 3.963 | 0.748 | | |
| 8 | ∞ | 0.300 | 1.5168 | 64.2 |
| 9 | ∞ | | | |

Aspherical surface coefficient5

First surface

| K = | −0.16841E+00 |
|---|---|
| A4 = | 0.49908E−02 |
| A6 = | −0.13504E−01 |
| A8 = | 0.12456E−01 |
| A10 = | −0.53148E−02 |
| A12 = | 0.98065E−03 |

Second surface

| K = | −0.10000E+02 |
|---|---|
| A4 = | 0.14564E−01 |
| A6 = | −0.33642E−01 |
| A8 = | 0.23437E−01 |
| A10 = | −0.26397E−03 |

Fourth surface

| K = | −0.72091E+00 |
|---|---|
| A4 = | 0.25993E−01 |
| A6 = | −0.49582E−01 |
| A8 = | 0.63503E−01 |
| A10 = | −0.18059E−01 |
| A12 = | 0.99986E−03 |

Fifth surface

| K = | −0.25841E+01 |
|---|---|
| A4 = | −0.50927E−01 |
| A6 = | 0.20147E−01 |
| A8 = | −0.59446E−02 |
| A10 = | 0.87705E−02 |
| A12 = | −0.20106E−02 |

Sixth surface

| K = | −0.50000E+01 |
|---|---|
| A4 = | 0.67796E−02 |
| A6 = | −0.37531E−02 |
| A8 = | 0.84713E−03 |
| A10 = | −0.64059E−04 |
| A12 = | 0.42936E−06 |
| A14 = | 0.82385E−07 |

Seventh surface

TABLE 3-continued

| K = | −0.49239E+01 |
|---|---|
| A4 = | −0.28354E−01 |
| A6 = | 0.58588E−02 |
| A8 = | −0.88006E−03 |
| A10 = | 0.62026E−04 |
| A12 = | −0.83881E−06 |
| A14 = | −0.60156E−07 |

Elemental lens data

| Lens | Starting surface | FOCAL LENGTH (mm) |
|---|---|---|
| 1 | 1 | 5.713 |
| 2 | 4 | 6.890 |
| 3 | 6 | −4.989 |

Fourth Example

Figure 11:
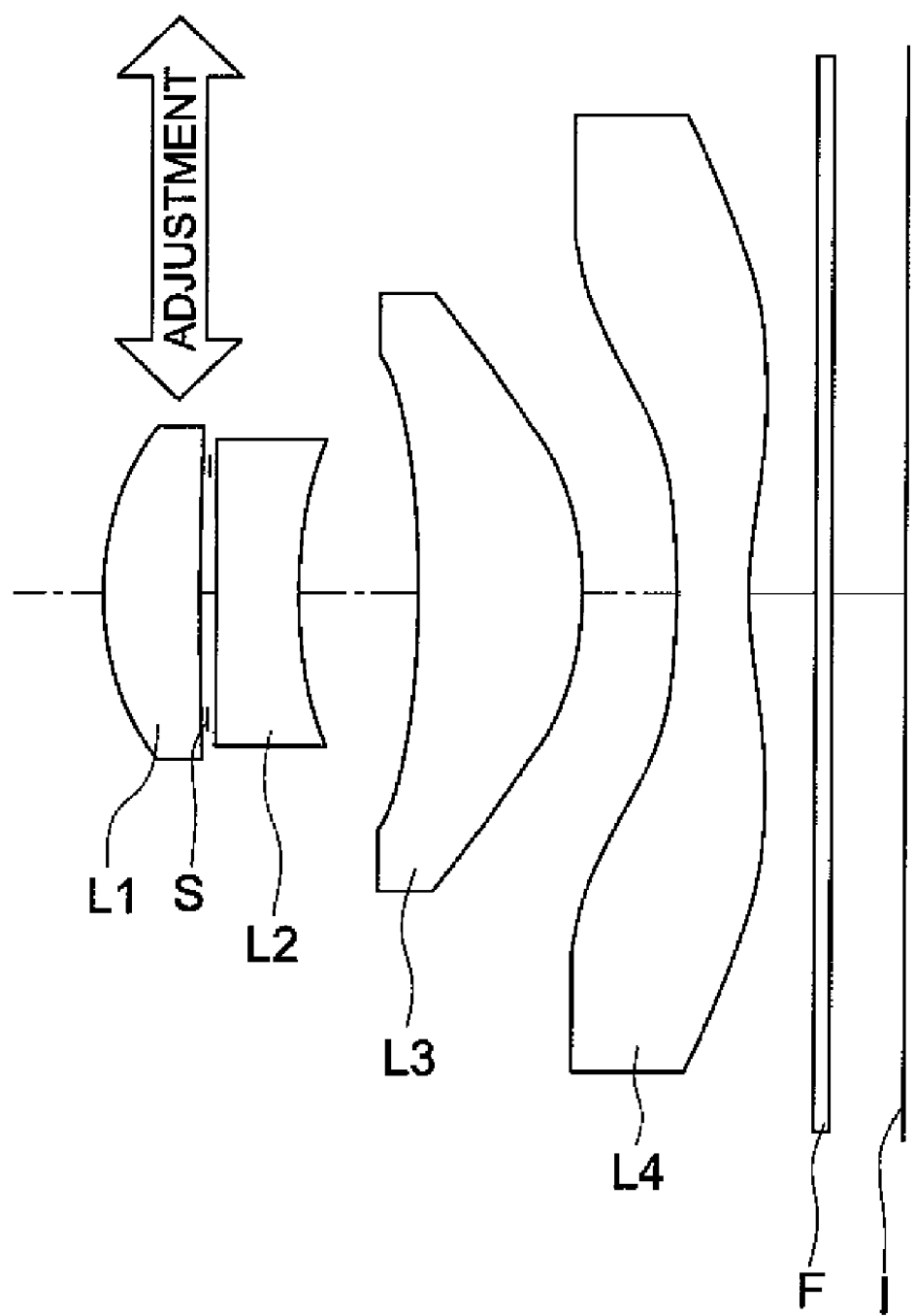
FIG. 11 is a sectional view illustrating an imaging lens of a forth example.

The lens data of the fourth example is illustrated in Table 4. FIG. 11 illustrates a sectional view of the imaging lens of the third example. In the drawing, L1 indicates a positive first lens that can be adjusted in the direction perpendicular to the optical axis, L2 indicates a negative second lens, L3 indicates a positive third lens, L4 indicates a negative fourth lens on the most image side, S indicates an aperture diaphragm arranged between L1 and L2, and I indicates the image pickup surface. The rear lens group is the lenses L2-L4. F is a parallel plate assumed to be the optical low pass filter, an IR cut filter and a seal glass of a solid state image pickup device. FIGS. 12a, 12b and 12c illustrate aberration figures showing the spherical aberration, the astigmatism and the distortion of the imaging lens applied to the fourth example, respectively. Here, in the spherical aberration figure, g expresses the spherical aberration amount at the g-line, and d expresses the spherical aberration amount at the d-line. In the astigmatism figure, the solid line S expresses the sagittal surface, and the two-dot chain line M expresses the meridional surface. In the fourth example, when the eccentricity amount Δ of the first lens L1 is 10 μm, the deviation amount ΔM of the meridional image surface is 32 μm, and the parallel eccentricity sensitivity |E|=3.2.

TABLE 4

Fourth example
f = 4.888 mm fB = 0.500 mm F = 2.8 2Y = 7.056 mm

| Surface number | R (mm) | D (mm) | Nd | vd |
|---|---|---|---|---|
| 1* | 1.816 | 0.689 | 1.5447 | 56.2 |
| 2* | 1.124E+06 | 0.026 | | |
| 3 (aperture diaphragm) | ∞ | 0.101 | | |
| 4* | −25.691 | 0.588 | 1.6320 | 23.4 |
| 5* | 4.111 | 0.834 | | |
| 6* | −5.771 | 1.165 | 1.5447 | 56.2 |
| 7* | −1.531 | 0.667 | | |
| 8* | −4.817 | 0.500 | 1.5447 | 56.2 |
| 9* | 2.375 | 0.484 | | |
| 10 | ∞ | 0.145 | 1.5163 | 64.1 |
| 11 | ∞ | | | |

Aspherical surface coefficient

First surface

TABLE 4-continued

| | |
|---|---|
| K = | −0.83790E−01 |
| A4 = | 0.10287E−01 |
| A6 = | 0.40833E−02 |
| A8 = | 0.30554E−02 |
| A10 = | 0.36443E−02 |
| Second surface | |
| K = | −0.50001E+02 |
| A4 = | 0.56254E−01 |
| A6 = | −0.18541E−01 |
| A8 = | 0.61624E−02 |
| A10 = | −0.29090E−02 |
| Fourth surface | |
| K = | 0.49999E+02 |
| A4 = | 0.66688E−01 |
| A6 = | −0.44421E−01 |
| A8 = | −0.12524E−01 |
| A10 = | 0.29366E−01 |
| A12 = | −0.22744E−01 |
| Fifth surface | |
| K = | −0.29162E+01 |
| A4 = | 0.67961E−01 |
| A6 = | 0.30382E−02 |
| A8 = | −0.37774E−01 |
| A10 = | 0.41627E−01 |
| A12 = | −0.13557E−01 |
| Sixth surface | |
| K = | −0.11580E+02 |
| A4 = | −0.21222E−01 |
| A6 = | −0.19621E−01 |
| A8 = | 0.18968E−01 |
| A10 = | −0.75413E−02 |
| A12 = | 0.12527E−02 |
| Seventh surface | |
| K = | −0.45778E+01 |
| A4 = | −0.10428E+00 |
| A6 = | 0.50051E−01 |
| A8 = | −0.25796E−01 |
| A10 = | 0.85558E−02 |
| A12 = | −0.10269E−02 |
| Eighth surface | |
| K = | 0.52630E−01 |
| A4 = | −0.89642E−01 |
| A6 = | 0.26541E−01 |
| A8 = | −0.97550E−03 |
| A10 = | −0.49329E−03 |
| A12 = | 0.72438E−04 |
| A14 = | −0.31112E−05 |
| Ninth surface | |
| K = | −0.12208E+02 |
| A4 = | −0.51175E−01 |
| A6 = | 0.12227E−01 |
| A8 = | −0.20305E−02 |
| A10 = | 0.20147E−03 |
| A12 = | −0.98778E−05 |
| A14 = | 0.16620E−06 |

Elemental Lens Data

| Lens | Starting surface | FOCAL LENGTH (mm) |
|---|---|---|
| 1 | 1 | 3.334 |
| 2 | 4 | −5.565 |
| 3 | 6 | 3.489 |
| 4 | 8 | −2.851 |

Fifth Example

Figure 13:
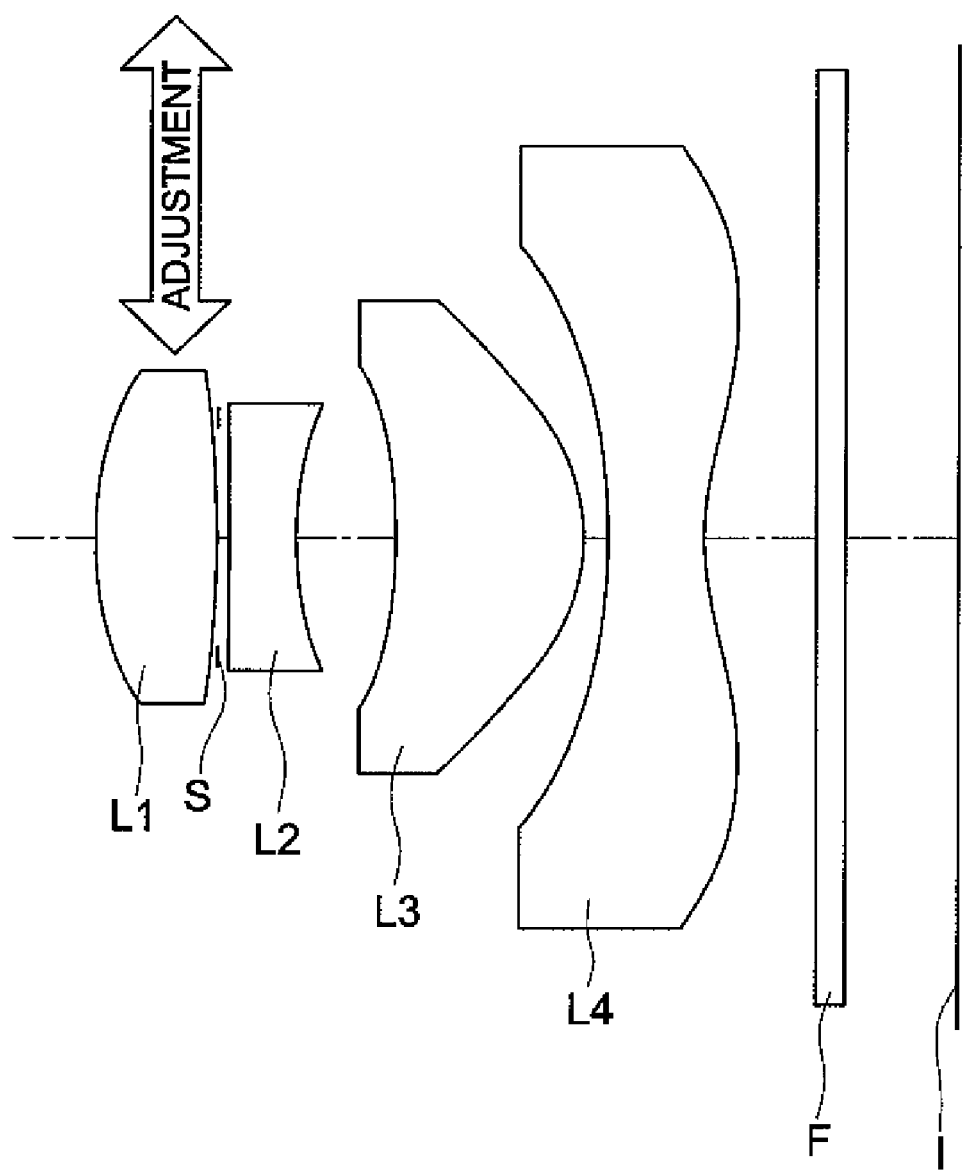
FIG. 13 is a sectional view illustrating an imaging lens of a fifth example.
Figure 14:
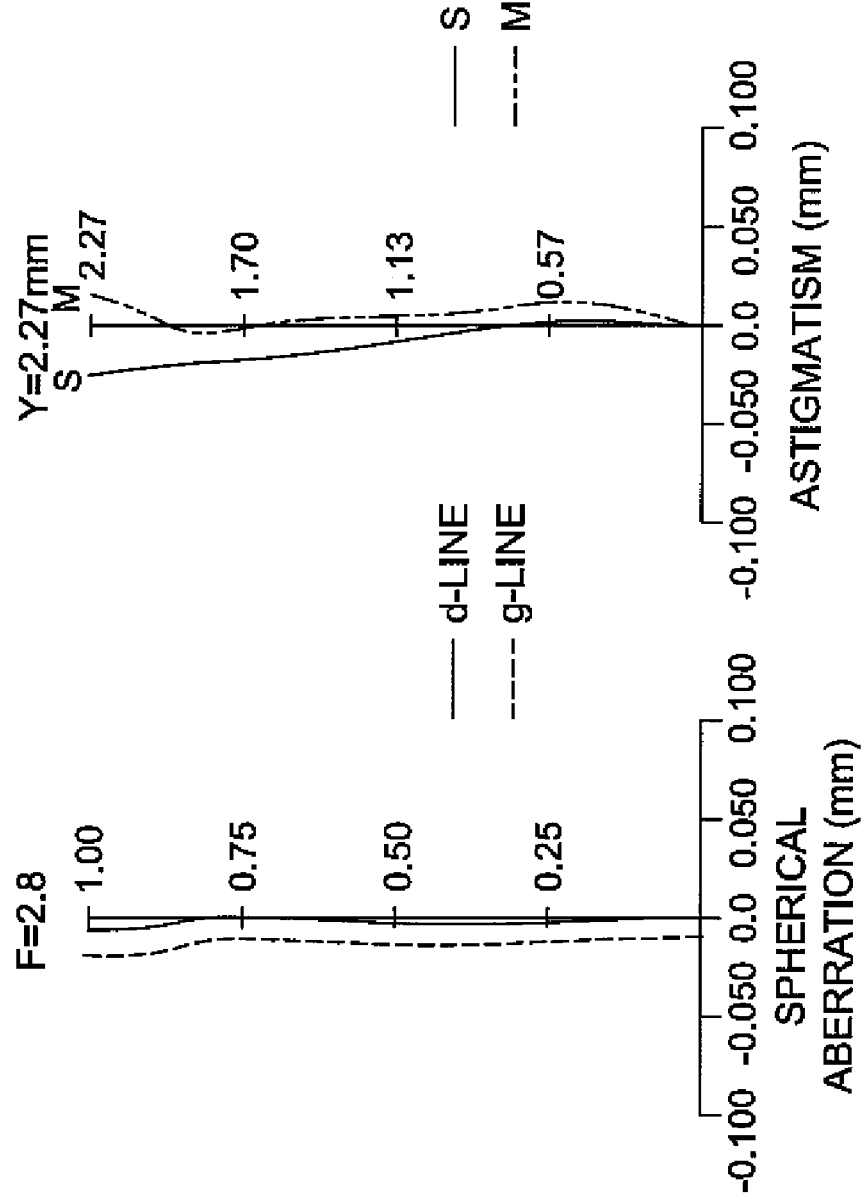
FIG. 14a is an aberration figure illustrating a spherical aberration of the imaging lens pertaining to the fifth example.
FIG. 14b is an aberration figure illustrating astigmatism of the imaging lens pertaining to the fifth example.
FIG. 14c is an aberration figure illustrating a distortion of the imaging lens pertaining to the fifth example.

The lens data of the fifth example is illustrated in Table 5, FIG. 13 illustrates a sectional view of the imaging lens of the third example. In the drawing, L1 indicates a positive first lens that can be adjusted in the direction perpendicular to the optical axis, L2 indicates a negative second lens, L3 indicates a positive third lens, L4 indicates a negative fourth lens on the most image side, S indicates an aperture diaphragm arranged between L1 and L2, and I indicates the image pickup surface. The rear lens group is the lenses L2-L4. F is a parallel plate assumed to be the optical low pass filter, an IR cut filter and a seal glass of a solid state image pickup device. FIGS. 14a, 14b and 14c illustrate aberration figures showing the spherical aberration, the astigmatism and the distortion of the imaging lens applied to the fifth example, respectively. Here, in the spherical aberration figure, g expresses the spherical aberration amount at the g-line, and d expresses the spherical aberration amount at the d-line. In the astigmatism figure, the solid line S expresses the sagittal surface, and the two-dot chain line M expresses the meridional surface. In the fifth example, when the eccentricity amount Δ of the first lens L1 is 10 μm, the deviation amount ΔM of the meridional image surface is 31 μm, and the parallel eccentricity sensitivity |E|=3.1.

TABLE 5

Fifth example
f = 3.294 mm fB = 0.500 mm F = 2.8 2Y = 4.536 mm

| Surface number | R (mm) | D (mm) | Nd | νd |
|---|---|---|---|---|
| 1* | 1.378 | 0.571 | 1.5447 | 56.2 |
| 2* | −6.370 | 0.000 | | |
| 3 (aperture diaphragm) | ∞ | 0.050 | | |
| 4* | −50.422 | 0.330 | 1.6320 | 23.4 |
| 5* | 2.523 | 0.445 | | |
| 6* | −2.536 | 0.893 | 1.5447 | 56.2 |
| 7* | −0.704 | 0.126 | | |
| 8* | −2.649 | 0.450 | 1.5447 | 56.2 |
| 9* | 1.161 | 0.490 | | |
| 10 | ∞ | 0.145 | 1.5163 | 64.1 |
| 11 | ∞ | | | |

Aspherical surface coefficient

First surface

| | |
|---|---|
| K = | −0.56202E+00 |
| A4 = | −0.52445E−02 |
| A6 = | −0.70419E−01 |
| A8 = | 0.10623E+00 |
| A10 = | −0.29497E+00 |
| Second surface | |
| K = | 0.75595E+01 |
| A4 = | 0.27740E−01 |
| A6 = | −0.35539E−01 |
| A8 = | −0.74147E+00 |
| A10 = | 0.95343E+00 |
| Fourth surface | |
| K = | 0.50000E+02 |
| A4 = | 0.17120E+00 |
| A6 = | −0.65756E−01 |
| A8 = | −0.54460E+00 |
| A10 = | 0.10906E+01 |
| A12 = | −0.63113E+00 |
| Fifth surface | |
| K = | 0.40363E+01 |
| A4 = | 0.16733E+00 |
| A6 = | 0.12182E+00 |
| A8 = | −0.48870E+00 |

TABLE 5-continued

| | |
|---|---|
| A10 = | 0.15244E+01 |
| A12 = | −0.15559E+01 |

Sixth surface

| | |
|---|---|
| K = | −0.20214E+00 |
| A4 = | −0.95330E−01 |
| A6 = | −0.13320E+00 |
| A8 = | −0.44773E+00 |
| A10 = | −0.65022E+00 |
| A12 = | 0.55041E+00 |

Seventh surface

| | |
|---|---|
| K = | −0.37041E+01 |
| A4 = | −0.36731E+00 |
| A6 = | 0.42581E+00 |
| A8 = | −0.49610E+00 |
| A10 = | 0.37150E+00 |
| A12 = | −0.11363E+00 |

Eighth surface

| | |
|---|---|
| K = | −0.38577E+02 |
| A4 = | −0.23817E+00 |
| A6 = | 0.14388E−00 |
| A8 = | −0.18988E−01 |
| A10 = | −0.18428E−01 |
| A12 = | 0.83604E−02 |
| A14 = | −0.11331E−02 |

Ninth surface

| | |
|---|---|
| K = | −0.11076E+02 |
| A4 = | −0.13205E+00 |
| A6 = | 0.73334E−01 |
| A8 = | −0.32747E−01 |
| A10 = | 0.87685E−02 |
| A12 = | −0.13833E−02 |
| A14 = | 0.99176E−04 |

Elemental Lens Data

| Lens | Starting surface | FOCAL LENGTH (mm) |
|---|---|---|
| 1 | 1 | 2.135 |
| 2 | 4 | −3.793 |
| 3 | 6 | 1.527 |
| 4 | 8 | −1.422 |

Sixth Example

Figure 15:
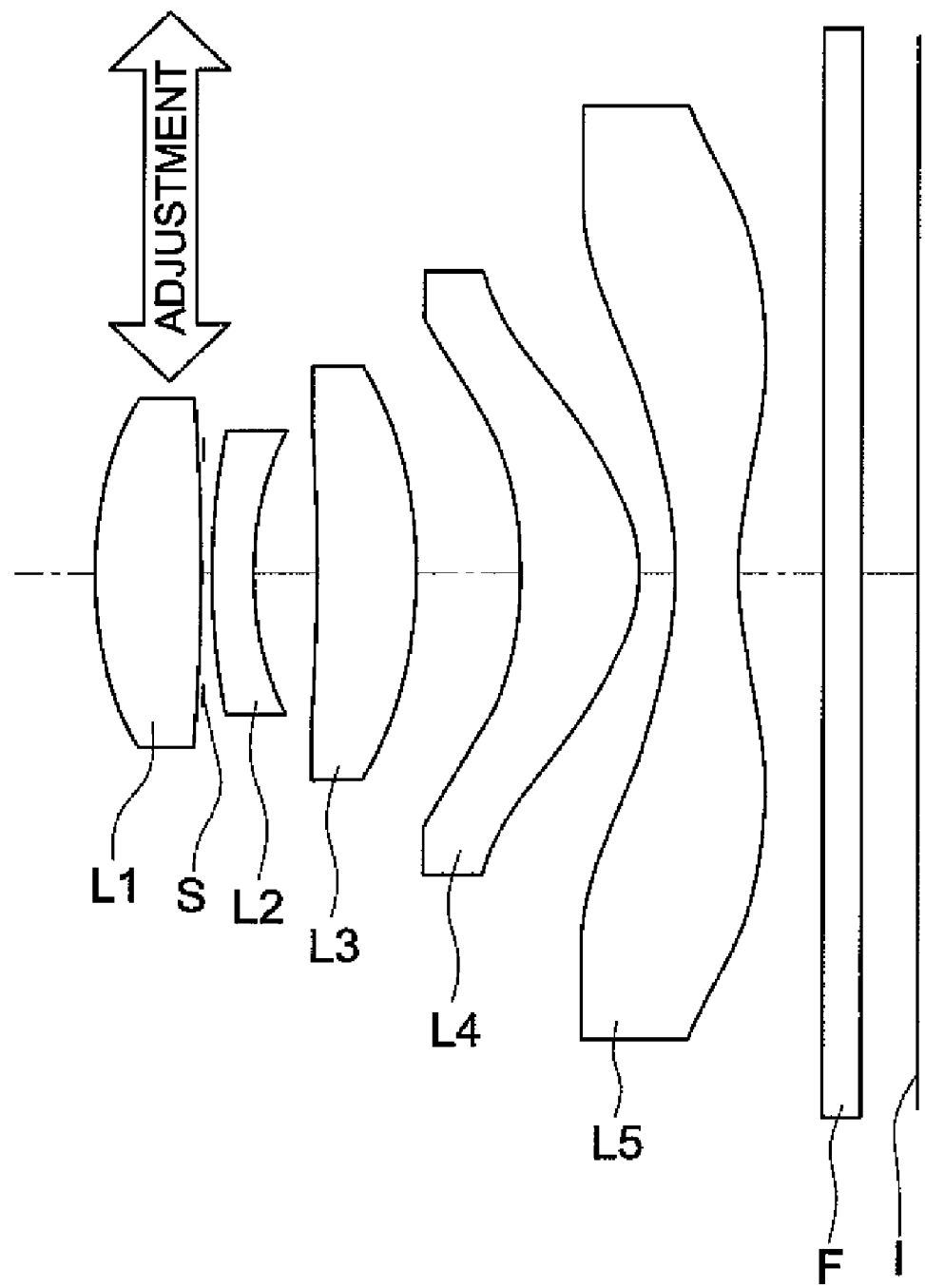
FIG. 15 is a sectional view illustrating an imaging lens of a sixth example.
Figure 16:
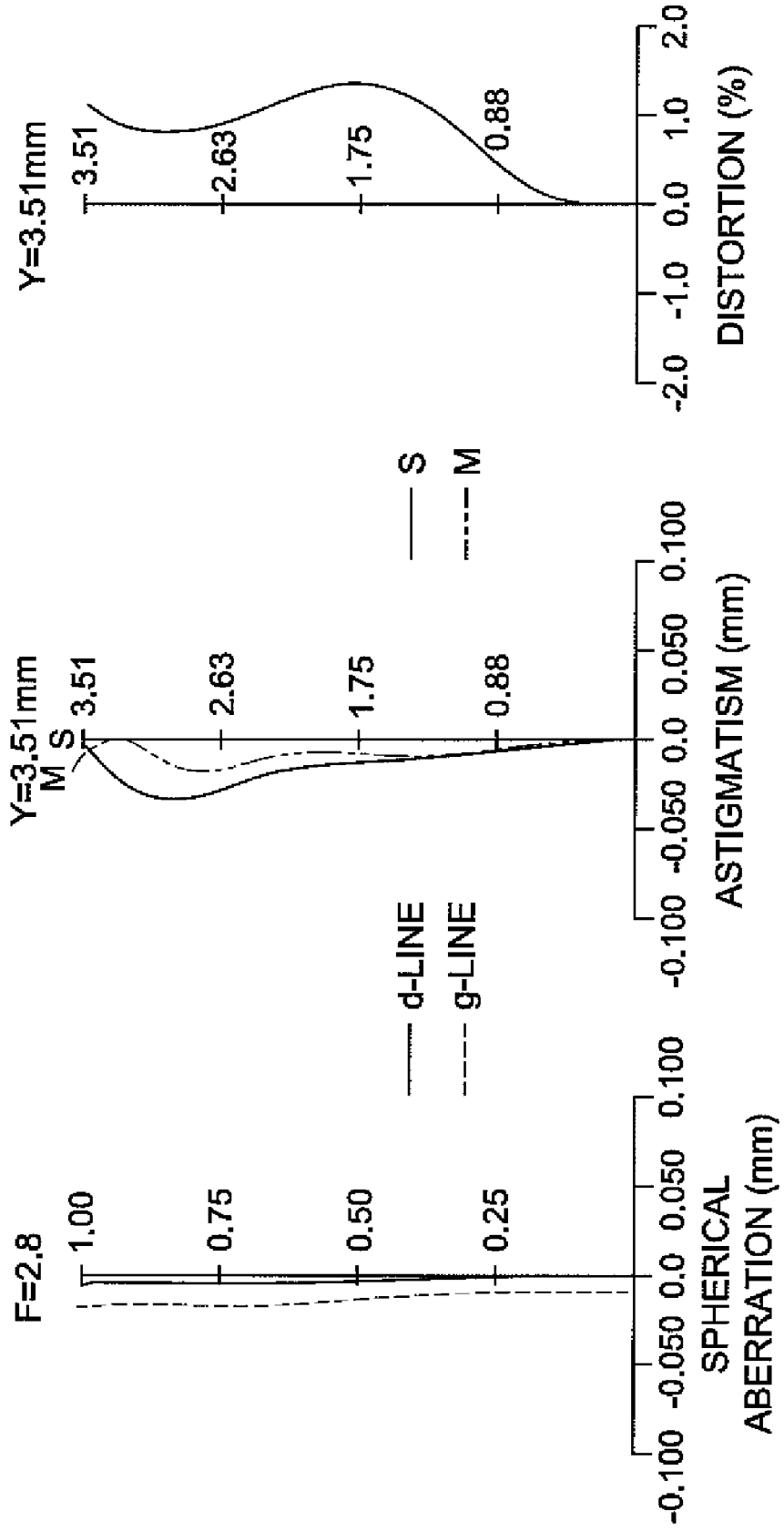
FIG. 16a is an aberration figure illustrating a spherical aberration of the imaging lens pertaining to the sixth example.
FIG. 16b is an aberration figure illustrating astigmatism of the imaging lens pertaining to the sixth example.
FIG. 16c is an aberration figure illustrating a distortion of the imaging lens pertaining to the sixth example.

The lens data of the sixth example is illustrated in Table 6. FIG. 15 illustrates a sectional view of the imaging lens of the third example. In the drawing, L1 indicates a positive first lens that can be adjusted in the direction perpendicular to the optical axis, L2 indicates a negative second lens, L3 indicates a positive third lens, L4 indicates a positive fourth lens, L5 indicates a negative fifth lens on the most image side, S indicates an aperture diaphragm arranged between L1 and L2, and I indicates the image pickup surface. The rear lens group is the lenses L2-L5. F is a parallel plate assumed to be the optical low pass filter, an IR cut filter and a seal glass of a solid state image pickup device. FIGS. 16a, 16b and 16c illustrate aberration figures showing the spherical aberration, the astigmatism and the distortion of the imaging lens applied to the sixth example, respectively. Here, in the spherical aberration figure, g expresses the spherical aberration amount at the g-line, and d expresses the spherical aberration amount at the d-line. In the astigmatism figure, the solid line S expresses the sagittal surface, and the two-dot chain line M expresses the meridional surface. In the sixth example, when the eccentricity amount Δ of the first lens L1 is 10 μm, the deviation amount ΔM of the meridional image surface is 25 μm, and the parallel eccentricity sensitivity |E|=2.5.

TABLE 6

Sixth example
f = 4.674 mm fB = 0.303 mm F = 2.8 2Y = 7.016 mm

| Surface number | R (mm) | D (mm) | Nd | νd |
|---|---|---|---|---|
| 1* | 2.139 | 0.755 | 1.5447 | 56.2 |
| 2* | −12.527 | 0.020 | | |
| 3 (aperture diaphragm) | ∞ | 0.065 | | |
| 4* | 4.518 | 0.300 | 1.6320 | 23.4 |
| 5* | 1.883 | 0.470 | | |
| 6* | −6.771 | 0.680 | 1.5447 | 56.2 |
| 7* | −2.477 | 0.766 | | |
| 8* | −2.205 | 0.820 | 1.5447 | 56.2 |
| 9* | −0.949 | 0.265 | | |
| 10* | −2.190 | 0.450 | 1.5447 | 56.2 |
| 11* | 1.926 | 0.600 | | |
| 12 | ∞ | 0.300 | 1.5163 | 64.1 |
| 13 | ∞ | | | |

Aspherical surface coefficient

First surface

| | |
|---|---|
| K = | −0.26558E−01 |
| A4 = | −0.18851E−02 |
| A6 = | −0.22712E−02 |
| A8 = | 0.12727E−02 |
| A10 = | −0.21871E−02 |
| A12 = | 0.15882E−02 |
| A14 = | −0.16112E−02 |

Second surface

| | |
|---|---|
| K = | −0.30000E+02 |
| A4 = | 0.19494E−01 |
| A6 = | −0.23496E−03 |
| A8 = | −0.15827E−01 |
| A10 = | 0.25757E−02 |
| A12 = | −0.93408E−02 |
| A14 = | 0.68234E−02 |

Fourth surface

| | |
|---|---|
| K = | −0.17606E+02 |
| A4 = | −0.20001E−01 |
| A6 = | 0.65196E−01 |
| A8 = | −0.89833E−01 |
| A10 = | 0.39380E−01 |
| A12 = | −0.89967E−02 |
| A14 = | −0.12346E−02 |

Fifth surface

| | |
|---|---|
| K = | −0.38810E+01 |
| A4 = | 0.40167E−02 |
| A6 = | 0.60314E−01 |
| A8 = | −0.28396E−01 |
| A10 = | −0.24073E−01 |
| A12 = | 0.33881E−01 |
| A14 = | −0.12265E−01 |

Sixth surface

| | |
|---|---|
| K = | 0.91345E+01 |
| A4 = | −0.27556E−01 |
| A6 = | −0.56137E−02 |
| A8 = | 0.26908E−01 |
| A10 = | 0.63675E−02 |
| A12 = | 0.21773E−03 |
| A14 = | −0.24628E−02 |

Seventh surface

| | |
|---|---|
| K = | 0.13642E+01 |
| A4 = | −0.13834E−01 |
| A6 = | 0.20066E−01 |
| A8 = | −0.14488E−01 |
| A10 = | 0.75606E−02 |
| A12 = | 0.29344E−02 |

TABLE 6-continued

| | |
|---|---|
| A14 = | −0.90504E−03 |
| Eighth surface | |
| K = | 0.41709E+00 |
| A4 = | −0.64055E−01 |
| A6 = | 0.43892E−01 |
| A8 = | −0.59102E−02 |
| A10 = | −0.11128E−02 |
| A12 = | 0.69986E−03 |
| A14 = | −0.59521E−04 |
| Ninth surface | |
| K = | −0.30172E+01 |
| A4 = | −0.91767E−01 |
| A6 = | 0.30634E−01 |
| A8 = | −0.18830E−02 |
| A10 = | 0.61341E−04 |
| A12 = | −0.77714E−04 |
| A14 = | 0.77149E−05 |
| Tenth surface | |
| K = | −0.15996E+02 |
| A4 = | −0.44294E−01 |
| A6 = | 0.98072E−02 |
| A8 = | −0.98973E−04 |
| A10 = | −0.15586E−03 |
| A12 = | 0.17085E−04 |
| A14 = | −0.57279E−06 |
| Eleventh surface | |
| K = | −0.12494E+02 |
| A4 = | −0.30230E−01 |
| A6 = | 0.45170E−02 |
| A8 = | −0.71060E−03 |
| A10 = | 0.85375E−04 |
| A12 = | −0.64141E−05 |
| A14 = | 0.23016E−06 |

Elemental Lens Data

| Lens | Starting surface | FOCAL LENGTH (mm) |
|---|---|---|
| 1 | 1 | 3.416 |
| 2 | 4 | −5.344 |
| 3 | 6 | 6.792 |
| 4 | 8 | 2.485 |
| 5 | 10 | −1.812 |

Seventh Example

Figure 17:
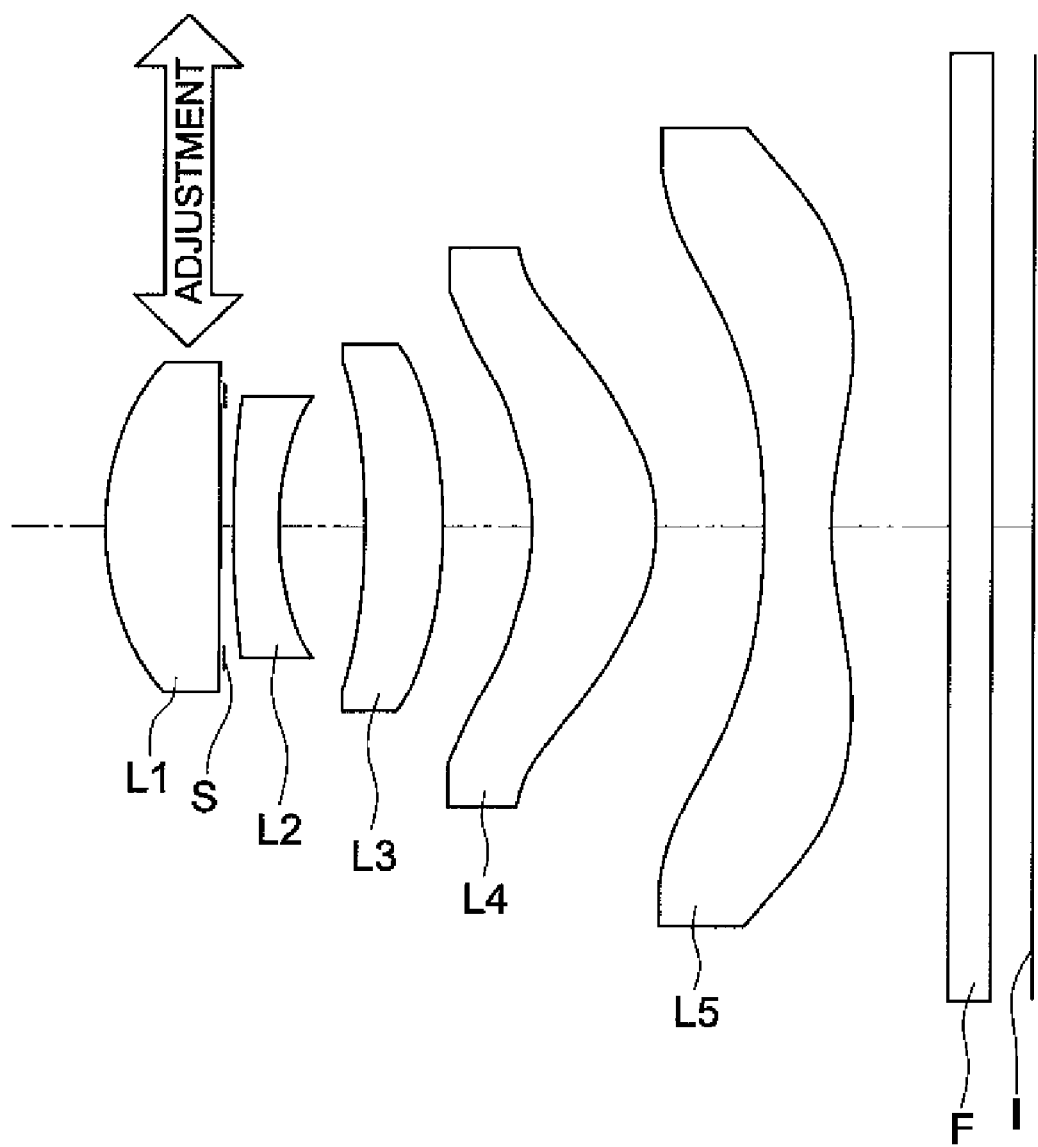
FIG. 17 is a sectional view illustrating an imaging lens of a seventh example.

The lens data of the seventh example is illustrated in Table 7. FIG. 17 illustrates a sectional view of the imaging lens of the third example. In the drawing, L1 indicates a positive first lens that can be adjusted in the direction perpendicular to the optical axis, L2 indicates a negative second lens, L3 indicates a positive third lens, L4 indicates a positive fourth lens, L5 indicates a negative fifth lens on the most image side, S indicates an aperture diaphragm arranged between L1 and L2, and I indicates the image pickup surface. The rear lens group is the lenses L2-L5. F is a parallel plate assumed to be the optical low pass filter, an IR cut filter and a seal glass of a solid state image pickup device. FIGS. 18a, 18b and 18c illustrate aberration figures showing the spherical aberration, the astigmatism and the distortion of the imaging lens applied to the seventh example, respectively. Here, in the spherical aberration figure, g expresses the spherical aberration amount at the g-line, and d expresses the spherical aberration amount at the d-line. In the astigmatism figure, the solid line S expresses the sagittal surface, and the two-dot chain line M expresses the meridional surface. In the seventh example, when the eccentricity amount Δ of the first lens L1 is 10 μm, the deviation amount ΔM of the meridional image surface is 22 μm, and the parallel eccentricity sensitivity |E|=2.2.

TABLE 7

Seventh example
f = 5.673 mm fB = 0.303 mm F = 2.8 2Y = 7.016 mm

| Surface number | R (mm) | D (mm) | Nd | νd |
|---|---|---|---|---|
| 1* | 2.117 | 0.830 | 1.5447 | 56.2 |
| 2* | −10.718 | 0.020 | | |
| 3 (aperture diaphragm) | ∞ | 0.065 | | |
| 4* | 6.584 | 0.326 | 1.6320 | 23.4 |
| 5* | 2.041 | 0.625 | | |
| 6* | −4.849 | 0.555 | 1.5447 | 56.2 |
| 7* | −3.134 | 0.628 | | |
| 8* | −2.531 | 0.907 | 1.5447 | 56.2 |
| 9* | −1.488 | 0.764 | | |
| 10* | −6.064 | 0.450 | 1.5447 | 56.2 |
| 11* | 2.870 | 0.829 | | |
| 12 | ∞ | 0.300 | 1.5163 | 64.1 |
| 13 | ∞ | | | |

Aspherical surface coefficient5

| First surface | |
|---|---|
| K = | 0.15774E+00 |
| A4 = | 0.12623E−02 |
| A6 = | 0.15096E−02 |
| A8 = | −0.12604E−02 |
| A10 = | −0.78920E−03 |
| A12 = | 0.23414E−02 |
| A14 = | −0.11426E−02 |
| Second surface | |
| K = | −0.39157E+01 |
| A4 = | 0.46401E−01 |
| A6 = | −0.26258E−01 |
| A8 = | −0.12016E−01 |
| A10 = | 0.57931E−01 |
| A12 = | −0.60714E−01 |
| A14 = | 0.20234E−01 |
| Fourth surface | |
| K = | −0.30000E+02 |
| A4 = | −0.16032E−02 |
| A6 = | 0.59117E−02 |
| A8 = | 0.13271E−02 |
| A10 = | −0.19584E−01 |
| A12 = | 0.26067E−01 |
| A14 = | −0.14915E−01 |
| Fifth surface | |
| K = | −0.34811E+01 |
| A4 = | −0.81243E−02 |
| A6 = | 0.39713E−01 |
| A8 = | 0.76648E−02 |
| A10 = | −0.62520E−01 |
| A12 = | 0.78022E−01 |
| A14 = | −0.33420E−01 |
| Sixth surface | |
| K = | 0.15153E+02 |
| A4 = | −0.23998E−01 |
| A6 = | 0.25203E−01 |
| A8 = | −0.31287E−01 |
| A10 = | 0.54715E−01 |
| A12 = | −0.33934E−01 |
| A14 = | 0.11349E−01 |
| Seventh surface | |
| K = | 0.35960E+01 |
| A4 = | −0.38212E−02 |
| A6 = | 0.10828E−01 |
| A8 = | −0.45987E−02 |

TABLE 7-continued

| | |
|---|---|
| A10 = | 0.82107E−02 |
| A12 = | −0.32772E−02 |
| A14 = | 0.96076E−03 |
| Eighth surface | |
| K = | −0.69010E+01 |
| A4 = | −0.52359E−01 |
| A6 = | 0.90282E−02 |
| A8 = | 0.95207E−03 |
| A10 = | −0.13095E−02 |
| A12 = | 0.90252E−03 |
| A14 = | −0.16162E−03 |
| Ninth surface | |
| K = | −0.34824E+01 |
| A4 = | −0.55914E−01 |
| A6 = | 0.18374E−01 |
| A8 = | −0.59403E−02 |
| A10 = | 0.10535E−02 |
| A12 = | 0.16468E−03 |
| A14 = | −0.41647E−04 |
| Tenth surface | |
| K = | −0.70177E+01 |
| A4 = | −0.25267E−01 |
| A6 = | 0.13295E−02 |
| A8 = | 0.87644E−03 |
| A10 = | −0.16695E−03 |
| A12 = | 0.13419E−04 |
| A14 = | −0.44088E−06 |
| Eleventh surface | |
| K = | −0.14952E+02 |
| A4 = | −0.31634E−01 |
| A6 = | 0.53687E−02 |
| A8 = | −0.10529E−02 |
| A10 = | 0.14310E−03 |
| A12 = | −0.11165E−04 |
| A14 = | 0.38192E−06 |

Elemental Lens Data

| Lens | Starting surface | FOCAL LENGTH (mm) |
|---|---|---|
| 1 | 1 | 3.321 |
| 2 | 4 | −4.813 |
| 3 | 6 | 14.590 |
| 4 | 8 | 5.073 |
| 5 | 10 | −3.514 |

The parallel eccentricity sensitivity |E| of each example is summarized and illustrated in Table 8.

TABLE 8

| | First ex.[1)] | Second ex.[1)] | Third ex.[1)] | Fourth ex.[1)] | Fifth ex.[1)] | Sixth ex.[1)] | Seventh ex.[1)] |
|---|---|---|---|---|---|---|---|
| |E| | 1.2 | 1.7 | 2.4 | 3.2 | 3.1 | 2.5 | 2.2 |

[1)]ex.: example

With respect to the incidence light angle of the principal ray the light beam that reaches the image pickup surface of the solid state image pickup device, the incidence angle of the light beam is not necessarily designed small enough in the peripheral part of the image pickup surface in these examples of the present invention. However, in the latest technology, shading can be reduced by optimizing arrangement of the color filter of the solid state image pickup device and of an on-chip micro lens array. To be specifically, when the pitch of the color filter or the on-chip micro lens array is set to be slightly small with respect to the pixel pitch of the image pickup surface of the image pickup device, the shift of the color filter and the on-chip micro lens array to the pixel of the image pickup device increase with distance form the optical axis. Thus, the oblique incident light beam can be efficiently led to the light receiving section of each pixel. This arrangement controls the shading arising with the solid state image pickup device to be small. The embodiment of the present invention is designed to seek for miniaturization depending on the relaxation of the demand on the incident light angle of the principal ray.

What is claimed is:

1. An image pickup lens system, for a small-size image pickup apparatus, for forming an image of a subject on a photoelectrical conversion section of a solid state image pickup device, the lens system comprising, in order from an object side:
   a positive first lens which is movable in a direction perpendicular to an optical axis thereof;
   a diaphragm; and
   a rear lens group,
   wherein a parallel eccentricity sensitivity E of the first lens at a 70% image height thereof satisfies the following relationship:

$1 < |E| < 5$, where the parallel eccentricity sensitivity E is a ratio of displacement of image plane with respect to amount of parallel eccentricity.

2. The image pickup lens system of claim 1, wherein the rear lens group consists of four lenses.

3. The image pickup lens system of claim 1, wherein the rear lens group consists of three lenses.

4. The image pickup lens system of claim 1, wherein the rear lens group consists of two lenses.

5. The image pickup lens system of claim 1, wherein the rear lens group includes at least a negative lens.

6. The image pickup lens system of claim 1, wherein the rear lens group includes a negative lens provided on the rearmost side of the rear lens group.

7. The image pickup lens system of claim 1, wherein the first lens is moved in the direction perpendicular to the optical axis to align the first lens, and the first lens is fixed after being aligned.

8. The image pickup lens system of claim 1, comprising:
   a lens frame in which the lens system is disposed, the lens frame having a space, between the lens frame and the first lens, in a direction perpendicular to the optical axis of the first lens,
   wherein the first lens is fixed after being shifted in a direction perpendicular to the optical axis in a range of the space so as to be centralized.

9. The image pickup lens system of claim 8, further comprising:
   adhesive in the space between the lens frame and the first lens, wherein the adhesive fixes the lens.

10. A small-size image pickup apparatus, comprising:
    an image pickup device; and
    an image pickup lens system for forming an image of a subject on a photoelectrical conversion section of the solid state image pickup device, the lens system including in order from an object side:
    a positive first lens which is movable in a direction perpendicular to an optical axis thereof;
    a diaphragm; and
    a rear lens group, wherein a parallel eccentricity sensitivity E of the first lens at a 70% image height thereof satisfies the following relationship:

$1 < |E| < 5$, where the parallel eccentricity sensitivity E is a ratio of displacement of image plane with respect to amount of parallel eccentricity.

11. The small-size image pickup apparatus of claim 10, wherein the first lens is moved in the direction perpendicular to the optical axis to align the first lens, and the first lens is fixed after being aligned.

* * * * *